US010747902B2

(12) United States Patent
Fisse et al.

(10) Patent No.: US 10,747,902 B2
(45) Date of Patent: Aug. 18, 2020

(54) SYSTEM AND METHOD OF EFFICIENT AND SECURE DATA FILTERING OF NON-PERMITTED DATA

(71) Applicant: Atomite, Inc., Ridgewood, NJ (US)

(72) Inventors: Jon Lyndon Fisse, Ridgewood, NJ (US); Stephen Scott Goldbaum, Brooklyn, NY (US)

(73) Assignee: Atomite, Inc., Ridgewood, NJ (US)

( * ) Notice: Subject to any disclaimer, the term of this patent is extended or adjusted under 35 U.S.C. 154(b) by 0 days.

(21) Appl. No.: 16/303,524

(22) PCT Filed: May 25, 2017

(86) PCT No.: PCT/US2017/034562
§ 371 (c)(1),
(2) Date: Nov. 20, 2018

(87) PCT Pub. No.: WO2017/205683
PCT Pub. Date: Nov. 30, 2017

(65) Prior Publication Data
US 2020/0097679 A1    Mar. 26, 2020

Related U.S. Application Data

(60) Provisional application No. 62/341,286, filed on May 25, 2016.

(51) Int. Cl.
*G06F 21/62*    (2013.01)
*G06F 16/9535*    (2019.01)
(Continued)

(52) U.S. Cl.
CPC .......... *G06F 21/6254* (2013.01); *G06F 16/27* (2019.01); *G06F 16/901* (2019.01);
(Continued)

(58) Field of Classification Search
CPC .... G06F 21/6254; G06F 16/27; G06F 16/901; G06F 16/9535; G06F 16/951;
(Continued)

(56) References Cited

U.S. PATENT DOCUMENTS

| 7,013,290 B2 * | 3/2006 | Ananian ................ G06Q 30/02 705/26.42 |
| 9,934,517 B2 * | 4/2018 | Basheer ............. G06Q 30/0226 |

(Continued)

FOREIGN PATENT DOCUMENTS

| WO | WO 2016/116599 A1 | 7/2016 |
| WO | WO 2017/205679 A1 | 11/2017 |
| WO | WO 2017/205683 A1 | 11/2017 |

OTHER PUBLICATIONS

International Preliminary Report on Patentability for International Application No. PCT/US2017/034562, dated May 15, 2018.
(Continued)

*Primary Examiner* — Michael R Vaughan
(74) *Attorney, Agent, or Firm* — Sterne, Kessler, Goldstein & Fox P.L.L.C.

(57) ABSTRACT

Disclosed herein are system, apparatus, article of manufacture, method, and/or computer program product embodiments for the secure and efficient data filtering of non-permitted data. An embodiment operates by receiving a permissions profile modification request from a user device of a user to modify permissions profile information identified by an anonymized profile identifier. The embodiment further operates by modifying the permissions profile information associated with the user identified by the anonymized profile identifier, in response to receiving the permissions profile modification request to modify at least one permissions attribute of the users permissions profile information, and synchronizing the permitted profile information of the user stored in a permitted profile datastore based on
(Continued)

the modification to the permissions attribute of the users permissions profile information.

24 Claims, 17 Drawing Sheets

(51) Int. Cl.
  *G06F 16/951* (2019.01)
  *H04L 29/06* (2006.01)
  *G06F 16/27* (2019.01)
  *G06F 16/901* (2019.01)
  *H04L 29/08* (2006.01)

(52) U.S. Cl.
  CPC ........ *G06F 16/951* (2019.01); *G06F 16/9535* (2019.01); *H04L 63/0421* (2013.01); *H04L 63/101* (2013.01); *H04L 63/102* (2013.01); *H04L 67/306* (2013.01); *G06F 2221/2137* (2013.01); *H04L 67/42* (2013.01)

(58) Field of Classification Search
  CPC ............. G06F 2221/2137; G06F 21/62; H04L 63/0421; H04L 67/306; H04L 63/101; H04L 63/102; H04L 67/42
  See application file for complete search history.

(56) References Cited

U.S. PATENT DOCUMENTS

| | | |
|---|---|---|
| 2006/0242685 A1 | 10/2006 | Heard et al. |
| 2007/0078803 A1 | 4/2007 | Gilmour et al. |
| 2007/0239693 A1 | 10/2007 | Hellmuth et al. |
| 2010/0199098 A1 | 8/2010 | King |
| 2011/0137946 A1 | 6/2011 | Siress et al. |
| 2013/0086603 A1 | 4/2013 | Kruger et al. |
| 2013/0124628 A1 | 5/2013 | Weerasinghe |
| 2014/0304836 A1 | 10/2014 | Velamoor et al. |
| 2014/0310779 A1* | 10/2014 | Lof ................... G06F 21/6254 726/4 |

OTHER PUBLICATIONS

International Search Report and Written Opinion of the International Searching Authority for International Application No. PCT/US2017/034562, dated Jul. 28, 2017.
International Preliminary Report on Patentability for International Application No. PCT/US2017/034557, dated May 8, 2018.
International Search Report and Written Opinion of the International Searching Authority for International Application No. PCT/US2017/034557, dated Jul. 28, 2017.
"Datacoup—Reclaim your personal data", accessed Nov. 19, 2018, website: https://web.archive.org/web/20160320093424/https://datacoup.com/docs.

* cited by examiner

Home // Your Data // Main Data Profile
Select the personal information you choose to put to work

Characteristic Data
This category contains information about your or others in your household who share your last name (such as age, marital status, education and presence of children). 610-1

Allow all | Customize

Sensitive Personal Data
Special categories of personal data that are reasonable likely to be particular sensitive to certain individual.
610-2

Allow all | Customize

Customer Proprietary Network Information
Your Customer Proprietary Network Information (CPNI) (i.e., billing statement information and information that is made available to the carrier by the customer soley by virtue of the carrier-customer relationship.
610-3

Allow all | Customize

Home // Your Data // Main Data Profile // Characteristic Data

This category contains information about you or others in your household who share your last name (such as age, marital status, education and presence of children).

◁ Back

Characteristic Data

620-1 Date of Birth
📅 01/01/1955 ☑ Allow

620-2 Gender
⌄ Male ☑ Allow

620-3 Ethnicity
White ☑ Allow

620-4 Education
⌄ Completed High School ☐ Allow

620-5 Current Occupation
Other ☐ Allow

620-6 Marital Status
⌄ Single ☐ Allow

620-7 Number of Adults in Household
1 ☐ Allow

620-8 Presence of Children
⌄ No ☐ Allow

620-9 Number of Children
0 ☐ Allow

Home // Your Data // Permitted Recipients
Choose who can put your data to work

← Back

 Mobile Ad Networks
A mobile ad network is a business that specializes in matching up advertisers to mobile apps or site looking to host ads. Advertising networks work as brokers for both suppliers (apps or sites with content that can ads) and buyer (the advertisers).
| Allow all | Customize | 710-1

 Social Media
Social network sites are web-based services that allow individuals to create a public profile, to create a list of users with whom to share connections, and view and cross the connections within the system.
| Allow all | Customize | 710-2

 Data Brokers
A data broker is a business that collects personal information about consumers and sells that information to other organizations.
| Allow all | Customize | 710-3

Home // Your Data // Permitted Recipients // Mobile Ad Networks

A mobile ad network is a business that specializes in matching up advertisers to mobile apps or site looking to host ads. Advertising networks work as brokers for both suppliers (apps or sites with content that can ads) and buyer (the advertisers).

◁ Back                                           ☐ Allow All 720-1 | Admob                                    ☑ Allow 720-2 | Open Mediaworks                          ☑ Allow 720-3 | Unity Ads                                ☑ Allow 720-4 | Chartboost                               ☐ Allow 720-5 | Appleovin                                ☐ Allow 720-6 | MobileCore                               ☑ Allow ( Continue )

FIG. 7B

SYSTEM AND METHOD OF EFFICIENT AND SECURE DATA FILTERING OF NON-PERMITTED DATA

CROSS REFERENCE TO RELATED APPLICATIONS

This application is the National Stage of International Application No. PCT/US2017/034562, filed on May 25, 2017, which claims the benefit of U.S. Provisional Application No. 62/341,286, filed on May 25, 2016. All of above applications are hereby incorporated herein in their entireties by reference.

BACKGROUND

Field

This disclosure is generally directed to filtering of non-permitted data. More particularly, this disclosure relates to the efficient and secure data filtering of non-permitted data.

Background

Network services providers such as mobile telecommunications carriers are facing a host of competitive challenges resulting in lower average revenue per user (ARPU) and higher churn rates. While these network providers control vast amounts of user profile information (or first party information) initially acquired for the purpose of providing network services to their subscribers or end users, they remain reticent to utilize the user profile information for various other purposes (e.g., the serving of more relevant product information, etc.) given their fears of a consumer privacy backlash and running afoul of government regulation.

SUMMARY

Provided herein are system, apparatus, article of manufacture, method and/or computer program product embodiments, and/or combinations and sub-combinations thereof, for efficient and secure data filtering of non-permitted data.

An embodiment includes a computer implemented method for efficient data filtering of non-permitted data. The method may operate by receiving a permissions profile modification request from a user device of a user to modify permissions profile information identified by an anonymized profile identifier. The embodiment further operates by modifying the permissions profile information associated with the user identified by the anonymized profile identifier, in response to receiving the permissions profile modification request to modify at least one permissions attribute of the user's permissions profile information, and synchronizing the permitted profile information of the user stored in a permitted profile datastore based on the modification to the permissions attribute of the user's permissions profile information.

Another embodiment includes a system for efficient and secure data filtering of non-permitted data. The system may include at least one processor and a memory coupled to the at least one processor and configured to receive a permissions profile modification request from a user device of a user to modify permissions profile information identified by an anonymized profile identifier. The embodiment further operates by modifying the permissions profile information associated with the user identified by the anonymized profile identifier, in response to receiving the permissions profile modification request to modify at least one permissions attribute of the user's permissions profile information, and synchronize the permitted profile information of the user stored in a permitted profile datastore based on the modification to the permissions attribute of the user's permissions profile information.

A further embodiment includes a tangible computer-readable device having instructions stored thereon that, when executed by at least one computing device, causes the at least one computing device to perform operations. The operations may include receiving a permissions profile modification request from a user device of a user to modify permissions profile information identified by an anonymized profile identifier. The embodiment further operates by modifying the permissions profile information associated with the user identified by the anonymized profile identifier, in response to receiving the permissions profile modification request to modify at least one permissions attribute of the user's permissions profile information, and synchronizing the permitted profile information of the user stored in a permitted profile datastore based on the modification to the permissions attribute of the user's permissions profile information.

BRIEF DESCRIPTION OF THE FIGURES

The accompanying drawings are incorporated herein and form a part of the specification.

FIGS. 6A-6B illustrate one or more UI views that enable an end user to modify his or her permissions profile information according to an example embodiment.

FIG. 7A-7B illustrate one or more UI views to modify access recipients information according to an example embodiment.

Figure 1A:
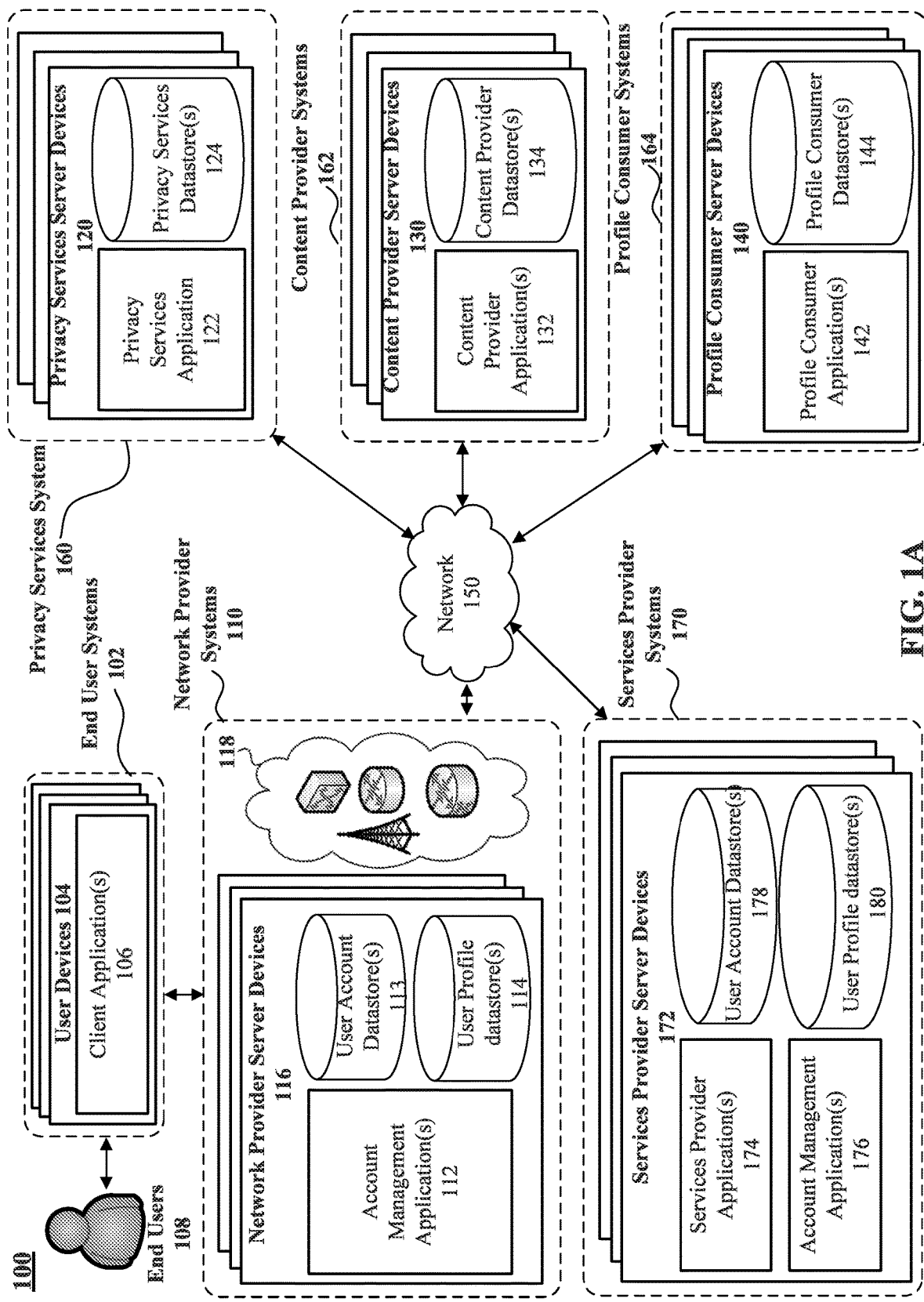
FIG. 1A illustrates a block diagram of efficient and secure data filtering of non-permitted data system in an example embodiment.

Like reference numerals refer to corresponding parts throughout the several views of the drawings. Additionally, generally, the left-most digit(s) of a reference number identifies the drawing in which the reference number first appears. Furthermore, one or more designators to the right of a reference number such as, for example, "m" and "n" and other similar designators are intended to be variables representing any positive integer. Thus, for example, if an implementation sets a value for n=4, then a complete set of elements 116-n may include elements 116-1, 116-2, 116-3, and 116-4. Furthermore, unless explicitly stated otherwise, a complete set of elements may vary for a given feature, embodiment, and/or implementation even though the same designator may be used between various features, embodiments, and/or implementations.

DETAILED DESCRIPTION

The inventors recognized a need for efficient and secure data filtering of non-permitted data is critical to network services providers in many situations. Network services providers such as mobile telecommunications carriers are facing a host of competitive challenges resulting in reduced mobile service pricing plans and higher churn rates. While these network providers control vast amounts of user profile information (or first party information) initially acquired for the purpose of providing network services to their subscribers or end users, they remain reticent to utilize the user profile information for various other purposes (e.g., enhancing search results, etc.) given their fears of a consumer privacy backlash and government regulation. While some solutions may enable a network services provider to share their end users' subscriber information with third party entities, these solutions suffer numerous deficiencies. For example, these solutions do not allow their end users to control the purpose for which their user profile information may be used by third party entities. These solutions also do not allow their end users to control specific types of information that may be accessible by third party entities nor do they allow their end user to control the amount of time their user profile information may be accessible to third party entities.

To address these deficiencies and others, a privacy services system is provided herein to enable end users of various network services providers (or various services providers) to securely control their user profile information with respect to a variety of network services providers and/or services providers. The privacy services system provides these functionalities to the end users of network services providers (or services providers), even when the relationship between a network services provider (or services provider) and its end user has been terminated. Thus, the privacy services system would also allow the end users to control their user profile information with a previous network services provider even when the end user is no longer able to access the network services provider's services (e.g., mobile telecommunications services) because the relationship has been terminated. In this way, solutions are provided in which privacy concerns and even certain regulations premised on bona fide consumer transparency, control and express consent rights with respect to what personal information is stored and shared, with whom it is shared, for what purposes, and for how long, as well as the ability to view, edit, delete, and/or port that information (i.e., privacy by design) are accommodated.

To provide the end users of network services providers (or services providers) with the ability to control the access of their end users' user profile information in a secure and anonymous manner with various profile consumers (e.g., search engines, social networks, consumer insight companies, ad networks, etc.), the privacy services system may be configured to generate an anonymized profile identifier. The generated anonymized profile identifier may then be used to anonymously identify an end user within the privacy services system. The privacy services system may also associate the generated anonymized profile identifier with: (1) a profile consumer's profile identifier assigned by a profile consumer, (2) permissions profile information that define what portions of the user profile information is stored and/or shared, with which profile consumers it is shared, for what purposes, and for how long, and (3) a provider's profile identifier assigned by a network services provider (or a services provider). The respective profile identifiers may then be used by the privacy services systems to identify the same end user when communicating with the respective systems. However, by using these profile identifiers with its respective systems rather than intermingling profile identifiers, the security and anonymity of the user's identity may be preserved because neither the privacy services system nor the profile consumer system are able to identify any particular end user.

To further enhance the security of end users' user profile information, the privacy services system may also be configured to communicate with a permitted use gatekeeper application and associated permitted profile datastore via an encrypted communications protocol that is hosted or otherwise executed on the infrastructure of the network services provider (or services provider). In this manner, each end user's user profile information may never be stored or otherwise cached by the privacy services system, which substantially reduces the security footprint of the privacy services system. To further reduce security footprint and enhance security, the privacy services system may also direct the permitted use gatekeeper application to filter the user profile information and store only user profile information that each end user has allowed to be accessible in the permitted profile datastore, i.e., permitted profile information.

To provide the end users with the ability to control their user profile information, the privacy services system may further provide end users with the ability to allow or disallow specific profile attributes that may be shared with profile consumers. To further provide the end users with the ability to control their user profile information, the privacy services system may also provide the end users with the ability to allow or disallow specific profile consumers from accessing their permitted profile information and to set a time period for which their permitted profile information may be accessible by the various profile consumers. The privacy services system may then be configured to filter the user profile information for non-permitted information, and store the filtered user profile information as permitted profile information in the permitted profile datastore.

To ensure that profile consumers only have limited access to an end user's user profile information, the permitted gatekeeper application may be further configured to limit queries of user profile information by various profile consumers to permitted profile information that is stored within the permitted profile datastore. In this manner, the security of each end user's user profile information is further enhanced so that any breach in security protocol by a profile consumer may be limited to permitted profile information that is stored within the permitted profile datastore. It may be appreciated that these are merely a few of the features and benefits of the privacy services system. Additional features and benefits are further discussed with reference to specific embodiments.

FIG. 1A illustrates a block diagram of efficient and secure data filtering of non-permitted data system 100 that enables a user to control his or her user profile information that is stored with his or her network provider(s) and/or services provider(s). In an embodiment, the system 100 may include, without limitation, network provider systems 110, services provider systems 170, content provider systems 162, profile consumer systems 164, and privacy services system 160, where each of these devices and systems may be operatively and communicatively coupled via network 150. Additionally, the system 100 may include end users 108 and their associated user devices 104, which may be operatively and communicatively coupled to the network 150 via the communications network 118 of the network provider systems 110.

In various embodiments, the network 150 may be representative of one or more computer and/or telecommunications networks that may enable coupled and/or interconnected systems and/or devices to communicate information between and among each other. In various embodiments, the network 150 may include, without limitation, intranet, extranet, Internet, and/or any other local, regional or global telecommunications network. To ensure communication privacy and security, the various communications further discussed herein may be encrypted using one or more cryptographic protocols (e.g., Transport Layer Security (TLS), Secure Socket Layer (SSL), etc.)

In various embodiments, the network 150 may include various wireless network devices configured to encode and/or decode information and receive and/or transmit the encoded information as radio signals in frequencies consistent with the one or more wireless communications standards (e.g., Wireless IEEE 802.11, WiMAX IEEE 802.16, Global Systems for Mobile Communications (GSM), Enhanced Data Rates for GSM Evolution (EDGE), Long Term Evolution (LTE), Bluetooth standards, Near Field Communications (NFC) standards, etc.). Additionally or alternatively, the network 150 may also include various wired network devices configured to receive and/or transmit the encoded information as electrical and/or optical signals consistent with one or more wired and/or optical network standards (e.g., Ethernet, Fibre Channel, etc.).

In an embodiment, the network provider systems 110 (e.g., network provider systems 110-1, 110-2, 110-3 . . . 110-a) may be generally configured to provide end user systems 102 access to network 150 and various systems coupled to the network 150. In an embodiment, the network provider systems 110 may include a communications network 118 and network provider server devices 116. The communications network 118 of each network provider system may be generally configured to provide various user devices 104 of end user systems 102 access to network 150 and various systems connected to network 150.

To provide access to network 150 and various systems connected to network 150, the communications network 118 may include various network devices (e.g., routers, switches, base transceiver stations, base station controllers, media gateways, etc.) operatively and communicatively coupled to each other, the user devices 104, and the network 150. Additionally, the communications network 118 may be configured to implement various wireless, wired, and/or optical communications standards. In an embodiment, the network provider systems 110 may also be representative of telecommunications services providers, mobile telecommunications services providers, internet service providers, mobile network providers, and/or the like.

In an embodiment, the network provider server devices 116 may be generally configured to host or otherwise execute one or more applications and/or datastores. The one or more applications may include, without limitation, account management application(s) 112, user account datastore(s) 113, and/or user profile datastore(s) 114. In an embodiment, the account management application(s) 112 may be generally configured to enable one or more end users 108 (e.g., end user 108-1, 108-2, 108-3 . . . 108-b) to manage their account with the network provider systems 110. To enable end users 108 to manage their account with their respective network provider systems 110, the account management application(s) 112 may be generally configured to authenticate end users 108 of the network provider systems 110 based on the user authentication information (e.g., user name, passwords, personal identification number, unique alphanumeric identifier with a unique alphanumeric password, etc.), which may be stored in the one or more user account datastores 113.

In an embodiment, the account management application(s) 112 may also be generally configured to enable end users 108 to update at least a portion of their user profile information, which may be stored in the user profile datastore(s) 114. The user profile datastore(s) 114 may be generally configured to store user profile information collected or aggregated from the end user in connection with the services provided by the respective network provider systems 110, such as, for example, providing mobile telecommunication services to one or more user devices, providing Internet access to one or more user devices, and/or the like. Thus, the user profile datastore(s) 114 may include, without limitation, information that a user may be required to provide in order to use the network provider systems 110 (e.g., physical address and email address to create a user account, etc.) or one or more services of the network provider systems 110 (e.g., credit card type used for automatic payment, etc.).

In an embodiment, the user profile information may include, without limitation, user service history information, user characteristic information, user household economic information, user vehicles information, and/or other information that may be associated with an end user (e.g., information regarding end user's home, information regarding end user's household, etc.). The user service history information may include, without limitation, service access information (e.g., content which may be identified by a reference such as a Uniform Resource Identifier (URI) and/or Uniform Resource Locator (URL) the user has accessed via the respective network provider system within a specific time period (e.g., past week, past month, past six months, etc.), application telemetry information (mobile and/or desktop application usage, mobile and/or desktop application installation, web browser usage information, geo-location information, etc.), vehicle telemetry information (vehicle location information, vehicle speed, vehicle operational status, connected traffic signaling information, etc.), service plan information, service tier, number of devices assigned to user's account, the amount of data the user has downloaded and/or uploaded within a specific time period, and/or the like. The user characteristic information may include, without limitation, date of birth, gender, ethnicity, education, occupation, marital status, number of adults in house hold, presence of children, number of children and/or the like.

In an embodiment, the user household economic information may include, without limitation, estimated household income, credit scores from one or more credit reporting agencies, credit usage information which may include a frequency of purchases using a credit card within a specific time period (e.g., past month, past six months, etc.) and the type of credit cards the user used, and/or the like. The user vehicles information, which may include without limitation, vehicle manufacturer, vehicle year, and vehicle model for one or more vehicles in the user's household, intent to purchase a vehicle within a specific time period, and/or the like. In an embodiment, the services provider systems 170 (e.g., services provider systems 170-1, 170-2, 170-3 . . . 170-c) may be generally configured to provide end user systems 102 access to one or more services providers (e.g., telecommunications services provider, automotive services provider, content publishing services provider, ad targeting services provider, consumer insights services provider, etc.). Each services provider system may include one or more services provider server devices 172. The one or more content services provider server devices 172 may further be configured to host or otherwise execute one or more services provider applications 174, one or more account management applications 176, one or more user account datastores 178, and one or more content user profile datastores 180. In an embodiment, the services provider systems 170 may be generally configured to provide various user devices 104 of end user systems 102 with services such as automotive support services provider, content publishing services provider, social networking services provider, ad targeting services provider, consumer insights services provider, financial services provider, and/or the like.

In an embodiment, the one or more services provider applications 174 may be generally configured to receive one or more service requests to provide various user devices 104 of end user systems 102 with services such as, for example, autonomous vehicle support systems, traffic support systems, automotive support systems, consumer insights support systems, social networking systems (including social network support systems), financial management systems (including financial management support services), and/or the like. To enable end users 108 to manage their account with their respective services provider systems 170, the account management application(s) 176 may be generally configured to authenticate end users 108 of the services provider systems 170 based on the user authentication information (e.g., user name, passwords, personal identification number, unique alphanumeric identifier with a unique alphanumeric password, etc.), which may be stored in the user account datastore(s) 178.

In an embodiment, the account management application(s) 176 may also be generally configured to enable end users 108 to update at least a portion of their user profile information, which may be stored in the user profile datastore(s) 180. The user profile datastore(s) 180 may be generally configured to store user profile information collected or aggregated from the user in connection with the services provided by the respective services provider systems 170, such as, for example, providing autonomous vehicle support services, traffic support services, vehicle support services, Internet of Things (IoT) support services (e.g., smart appliances, etc.) including 'smart city' IoT supported devices (e.g., connected traffic sensors, etc.), providing social networking services, providing consumer insights services, providing financial management services and/or the like. Thus, the user profile datastore(s) 180 may include, without limitation, user profile information that a user may be required to provide in order to use the services provider systems 170 (e.g., vehicle information, contact information, financial information, etc.).

In an embodiment, the one or more content provider systems 162 (e.g., content provider system 162-1, 162-2, 162-3 . . . 162-0) may be generally configured to provide requested content to the end user systems 102. Each content provider system may include one or more content provider server devices 130. The one or more content provider server devices 130 may further be configured to host or otherwise execute one or more content provider applications 132 and/or one or more content provider datastores 134. The one or more content provider applications 132 may be configured to receive one or more content requests that are identified by one or more requested content references (e.g., URIs and/or URLs, etc.), and provide one or more content responses, which may include the requested content stored in the one or more content provider datastore(s) 134. In an embodiment, the one or more requested content may include one or more web pages, applications, databases, and/or the like. Additionally, the one or more requested content may further include one or more affiliated content references (e.g., URIs and/or URLs) identifying the location of the affiliated content, such that the end user systems 102 may request the affiliated content from the one or more profile consumer systems 164.

In an embodiment, the one or more profile consumer systems 164 (e.g., profile consumer system 164-1, 164-2, 164-3 . . . 164-e) may be generally configured to provide affiliated content requested by the end user systems 102. Each profile consumer system may include one or more profile consumer server devices 140. The one or more profile consumer server devices 140 may be configured to host or otherwise execute one or more profile consumer application(s) 142 and/or one or more profile consumer datastores 144. The one or more profile consumer application(s) 142 may be configured to receive one or more affiliated content requests that is identified by the affiliated content references (e.g., URIs and/or URLs, etc.), and provide one or more affiliated content responses, which may include the affiliated content stored in one or more profile consumer datastores 144. In an embodiment, the affiliated content may include, without limitation, advertising content, marketing content, sponsor content, search result content, and/or the like. In an embodiment, profile consumer systems 164 may be representative of marketer systems, social networking systems, consumer insights analysis systems, data broker systems, and/or the like.

In an embodiment, the one or more end user systems 102 (e.g., end user system 102-1, 102-2, 102-3 . . . 102-f) may be generally configured to provide one or more end users 108 with access to network 150 and its associated systems via an associated network provider system (e.g., network provider system 110-1, etc.). In an embodiment, each end user of the one or more end user systems 102 may include, without limitation, one or more user devices 104. Example user devices 104 may include without limitation, one or more mobile devices (mobile phones, smart phones etc.), computing devices (e.g., laptops, desktop computers, tablets, smart televisions, streaming media devices etc.), one or more embedded systems devices (e.g., vehicle navigation systems, autonomous vehicle driving systems, etc.) and/or the like. Each of the one or more user devices 104 may be configured to host or otherwise execute one or more client applications 106. The one or more client applications 106 may include, without limitation, one or more web browsers (e.g., GOOGLE Chrome, APPLE Safari, MOZILLA Firefox, etc.) configured to request content (e.g., web pages, etc.) identified by one or more URIs and/or URLs, content specific applications configured to access content associated with one or more provider server devices (e.g., NETFLIX, YOUTUBE, etc.), and/or the like.

In an embodiment, the privacy services system 160 may be generally configured to enable end users 108 to securely manage and control the access of their user profile information within one or more network provider systems 110 with respect to one or more profile consumer systems 164. The privacy services system 160 may include without limitation, one or more privacy services server devices 120. The one or more privacy services server devices 120 may be configured to host or otherwise execute a privacy services application 122 and one or more privacy services datastore(s) 124.

In an embodiment, the privacy services application 122 may be generally configured to receive requests from one or more end users 108 to enable the secure management and control of their user profile information within the one or more network provider systems 110. To enable the secure management and control of the one or more end users' 108 user profile information, the services application 122 may be generally configured to receive permissions profile control requests from one or more end users 108 to enable the secure management and control of their user profile information within one or more network provider systems 110.

In an embodiment, the privacy services application 122 may be configured to provide end users 108 with granular permissions profile control to specific information within each end user's user profile information. In an embodiment, the permissions profile control may allow end users 108 to allow or disallow access of some or all specific information within their user profile information. The permissions profile control may also allow end users 108 to allow or disallow access of their user profile information to some or all profile consumer systems 164. Furthermore, the permissions profile control may also allow end users 108 to limit the amount of time (e.g., one week, one month, two month, etc.) profile consumer systems 164 may access respective user profile information. Additionally, the permissions profile control may further allow users to limit a number of times (e.g., ten (10) times, twenty (20) times, etc.) the one or more profile consumer systems 164 may access respective user profile information before the user profile information is no longer accessible.

To allow one or more end users 108 to securely manage and control their user profile information, the privacy services application 122 may be configured to provide one or more user interface (UI) views to one or more client applications 106 of the respective end users' user devices 104. The one or more UI views may include, without limitation, one or more configurable UI elements that are representative of various user profile information. The one or more configurable UI elements may be configured to enable the end users 108 to manage and control their user profile information.

Figure 1B:
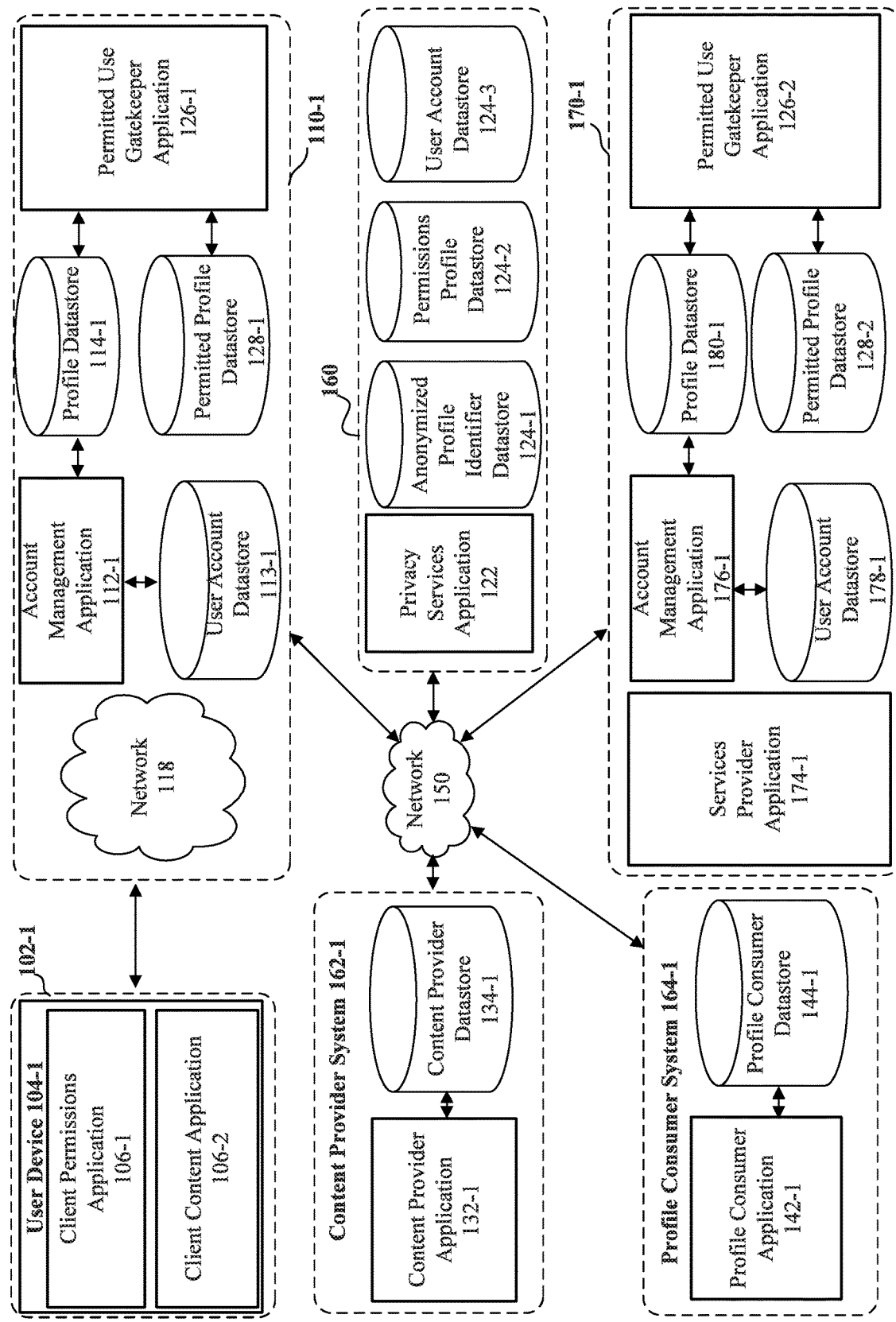
FIG. 1B illustrates a block diagram of various applications and datastores of the efficient and secure data filtering of non-permitted data system.

Additionally, to ensure that one or more end users' 108 user profile information are securely filtered, such that one or more profile consumer systems 164 can only access or otherwise receive only permitted profile information as defined by each end user's permissions profile control, the privacy services system 160 may be further configured to deploy permitted use gatekeeper applications 126 and associated permitted profile datastore 128 into one or more network provider server devices 116 of the one or more network provider systems 110 and/or one or more services provider server devices 172 of the one or more services provider systems 170 further discussed with respect to FIG. 1B.

It may be appreciated that while not explicitly illustrated, the one or more systems (e.g., privacy services system 160, content provider systems 162, services provider systems 170, profile consumer systems 164, etc.) and/or portions of the one or more systems (e.g., network provider server devices 116, etc.) may be implemented by server devices and/or network devices of various data centers of one or more public cloud computing services providers (e.g., MICROSOFT Azure, AMAZON Web Services, GOOGLE Compute Engine, etc.) and/or private or internal cloud computing services. The cloud computing services providers and/or internal cloud computing services may be configured to implement a variety of protocols (e.g., Hyper Text Transfer Protocol (HTTP), HTTP Secure (HTTPS), etc.), standard formats (e.g., JavaScript Object Notation (JSON), Extensible markup Language (XML), etc.), and/or APIs (e.g., MICROSOFT Services Management APIs, AMAZON Elastic Compute Cloud APIs, GOOGLE Cloud JSON APIs, etc.).

In such implementations, each of the various server devices may be operatively and/or communicatively coupled to each other within their respective systems via one or more network devices. For example, one or more network provider server devices 116 may be operatively and/or communicatively coupled to each other within a network provider system of the one or more network provider systems 110 via one or more network devices. Similarly, one or more privacy services server devices 120 may be operatively and/or communicatively coupled to each other within the privacy services system 160 via one or more network devices.

Additionally, each of these various server devices within their respective systems may also be configured to host or otherwise execute various type-1 or native hypervisors (e.g., VMWARE ESXi hypervisor, MICROSOFT Hyper-V hypervisor, UBUNTU LXD Container Hypervisor, etc.) and/or type-2 or non-native hypervisors (e.g., VMWARE Work Station, VirtualBox, etc.) where each hypervisor may be further configured to host or otherwise execute one or more guest operating systems (e.g., Windows Server, Ubuntu Server, Ubuntu Snappy, CoreOS Container Linux, VMware Photon, etc.) on each of the various server devices.

Furthermore, the one or more guest operating systems may be further configured to execute one or more native applications and/or native datastores directly on the guest operating system. Additionally or alternatively, the one or more guest operating systems may also be configured to host or otherwise execute one or more container applications and/or container datastores via a container engine (e.g., Docker Container Engine, rkt Container Engine, etc.). The native applications, native datastores, container applications, and/or container datastores may further include one or more cluster node management applications configured to enable orchestration, deployment, and/or management of the one or more container applications (e.g., Kubernetes, etc.). The cluster node management applications may be configured to provide high availability, redundancy, and scaling of the one or more container applications and/or container datastores.

In addition, the one or more native applications, native datastores, container applications, and/or container datastores may also be configured to implement a microservice architecture, where the structures of an application may be implemented as a set of individual microservices that are separated and organized by their discrete functions. The individual microservices may be implemented with a variety of programming languages and may be communicatively and/or operatively coupled to each other via distributed messaging systems (e.g., APACHE Kafka, etc.) and overlay networks (e.g., flannel, etc.) to collectively provide the functionalities of the one or more native applications and/or container applications.

It may be appreciated that while the example embodiments that follow (e.g., example embodiments of FIGS. 1B, 2, 3A-3C, 4, 5, 6A-6B, 7A-7B, 8, and 9-11) may reference specific devices, systems, implementations, and/or representations as those discussed above in FIG. 1A, the example embodiments are not so limited in their respective contexts. Thus, the specific network provider system 110-1, services provider system 170-1, profile consumer system 164-1, content provider system 162-1, and end user system 102-1 further discussed in the following example embodiments may be representative of any particular one of the one or more network provider systems 110, services provider systems 170, profile consumer systems 164, content provider systems 162, and end user systems 102, respectively, as discussed above in FIG. 1A.

FIG. 1B illustrates various applications and datastores of the efficient and secure data filtering of non-permitted data in an example embodiment. In the example embodiment, the system 100 may include the network provider system 110-1, services provider system 170-1, content provider system 162-1, profile consumer system 164-1, and privacy services system 160, where each of these systems may be operatively and/or communicatively coupled via at least network 150. Additionally, the system 100 may include end user system 102-1 operatively and/or communicatively coupled to the network 150 and the various systems via the communications network 118. Furthermore, to ensure communication privacy and security between privacy services application 122 and various other applications (e.g., content provider application 132-1, profile consumer application 142-1, client permissions application 106-1, permitted use gatekeeper application 126-1, permitted use gatekeeper application 126-2), the communications between the applications may be encrypted utilizing a secure and encrypted communications protocol (e.g., TLS, SSL, etc.).

In an embodiment, the network provider system 110-1 may be representative of a mobile telecommunications carrier configured to provide mobile phone services and Internet access services. The network provider system 110-1 may include an account management application 112-1 communicatively and/or operatively coupled to a user account datastore 113-1 and user profile datastore 114-1. To assist in the secure filtering of user profile information in accordance with user permissions control, the network provider system 110-1 may be configured to include a permitted use gatekeeper application 126-1 communicatively and/or operatively coupled to the user profile datastore 114-1 and the permitted profile datastore 128-1. In embodiments where the network provider system 110-1 may be configured to host or otherwise execute container applications via a container engine of one or more network provider server devices 116, the permitted use gatekeeper application 126-1 and permitted profile datastore 128-1 may be deployed in one or more containers to the network provider server devices 116 of network provider system 110-1.

In an embodiment, the services provider system 170-1 may be representative of a vehicle support services and/or autonomous vehicle support services configured to provide vehicle support services such as vehicle based navigation systems, autonomous vehicle driving systems, in-vehicle security, and/or remote diagnostics. The services provider system 170-1 may include an account management application 176-1 communicatively and/or operatively coupled to a user account datastore 178-1 and profile datastore 180-1. To assist in the secure filtering of user profile information in accordance with user permissions control, the services provider system 170-1 may be configured to include a permitted use gatekeeper application 126-2 communicatively and/or operatively coupled to the user profile datastore 180-1 and the permitted profile datastore 128-2. In embodiments where the services provider system 170-1 may be configured to host or otherwise execute container applications via a container engine of one or more network provider server devices 116, the permitted use gatekeeper application 126-2 and permitted profile datastore 128-2 may be deployed in one or more containers to the one or more services provider server devices 172 of the services provider system 170-1.

In an embodiment, the content provider system 162-1 may be configured to provide requested content such as, for example, streaming videos from a web page to the end user system 102-1, in response to receiving a content request from the end user system 102-1. In an embodiment, the requested content provided to the end user system 102-1 may include the requested content and one or more affiliated content references (e.g., URIs and/or URLs, etc.) to affiliated content stored in the profile consumer system 164-1. In an embodiment, the profile consumer system 164-1 may be representative of a sponsor or marketer configured to provide requested affiliated content such as, for example, a web banner for a sponsor or marketer of the request content. The profile consumer system 164-1 may also be configured to receive affiliated content requests, which may include, without limitation, a unique identification token from the end user system 102-1 that uniquely identifies the end user's user device 104-1 or the end user himself/herself within a particular network provider system (e.g., network provider system 110-1, etc.).

In an embodiment, the unique identification token may include an identifier that may uniquely identify an end user's user device (e.g., user device 104-1, etc.) and/or the end user. The unique identifier may be assigned by the end user's network provider system (e.g., network provider system 110-1, etc.) and may be added or otherwise incorporated (e.g., incorporated via HTTP header, etc.) into some or even all communications between the end user's user device and one or more systems (e.g., network provider systems 110, services provider systems 170, profile consumer systems 164, content provider systems 162, privacy services system 160, etc.). Additionally or alternatively, the unique identification token may be an unique identifier generated and transmitted to the user device by the privacy services system 160 (e.g., a web browser cookie with the unique identification token, etc.) when the user first creates a user account with the privacy services system 160. It may be appreciated that the unique identifier of the unique identification token may be different than a provider's profile identifier.

In an embodiment, the end user system 102-1 may include, without limitation a user device 104-1. The user device may be further configured to execute a client permissions application 106-1 and a client content application 106-2. The client permissions application 106-1 may be communicatively and/or operatively coupled to the privacy services application 122 and configured to enable an end user's user device 104-1 to manage his or her permissions profile control that may limit the profile consumer system 164-1 access to permitted profile information within the respective network provider system 110-1 and/or services provider system 170-1. The client content application 106-2 may be communicatively and/or operatively coupled to the content provider application 132-1 and configured to enable an end user's user device 104-1 to request content from the content provider system 162-1 via a content request and request affiliated content from profile consumer system 164-1 via an affiliated content request.

In an embodiment and to enable an end user to manage his or her permissions profile, the client permissions application 106-1 may be configured to visually present the one or more UI views on a display associated with the user device 104-1. The one or more UI views may further include one or more modifiable UI elements that are associated with the end user's permissions profile, which can be modified based on an end user's input.

In an embodiment, and to enable end users 108 access to content available from content provider system 162-1, the client content application 106-2 may be configured to request content from the content provider system 162-1, the content may include, for example, streaming videos which may be visually presented in one or more UI views. In an embodiment, the content may further include one or more URIs and/or URLs that are associated with affiliated content such as a sponsor. In these embodiments, the client content application 106-2 may be configured to request the affiliated content and visually present the affiliated content in the one or more UI views.

In an embodiment, the client permissions application 106-1 and/or client content application 106-2 may be implemented as native applications hosted, interpreted, or otherwise executed by an operating system of the user device 104-1. Additionally or alternatively, the client permissions application 106-1 and/or client content application 106-2 may be representative of a web browser hosted, interpreted and/or otherwise executed on the operating system of the user device 104-1. In an embodiment, the web browser may be operatively and/or communicatively coupled to the privacy services application 122 and may be configured to visually present one or more UI views as one or more web pages. Additionally, the web browser may also be operatively and/or communicatively coupled to the content provider application 132-1 and profile consumer application 142-1 and may be configured to visually present the requested content and affiliated content in one or more UI views as one or more web pages.

In an embodiment, the privacy services system 160 may include the privacy services application 122 configured to enable an end user of user device 104-1 to manage his or her permissions profile and limit access to his or her user profile information within the network provider system 110-1 and/or services provider system 170-1. The privacy services system 160 may further include, without limitation, an anonymized profile identifier datastore 124-1, a permissions profile datastore 124-2, and a user account datastore 124-3.

In an embodiment, the anonymized profile identifier datastore 124-1 may be configured to store anonymized profile information for each end user (e.g., end user 108-1, 108-2, 108-3, etc.). The anonymized profile information may include, without limitation, anonymized profile identifiers, provider's profile identifiers, provider identifiers, profile consumer's profile identifiers, profile consumer identifiers, unique identification tokens, and their respective relationships. In an embodiment, the end user's anonymized profile identifier may be a unique identifier created and assigned by the privacy services application 122 to uniquely identify the end user within the privacy services system 160.

In an embodiment, the provider's profile identifier may be created and assigned by one or more network provider systems (e.g., network provider system 110-1, 110-2, etc.) and/or one or more services provider systems (e.g., services provider system 170-1, 170-2, etc.) to uniquely identify the end user (e.g., end user 108-1, 108-2, 108-3, etc.) within the respective network provider system and/or services provider system. Thus, the provider's profile identifier may be a unique identifier within its respective network provider system or services provider system but not necessarily unique across multiple network provider systems (e.g., network provider system 110-1, 110-2, etc.) and/or services provider systems (services provider system 170-1, 170-2, etc.). In an embodiment, each end user's anonymized profile identifier may be associated with one or more provider's profile identifiers. In an embodiment, each provider's profile identifier may be associated with a provider identifier, where each provider identifier may be a unique identifier created and assigned by the identifier management component 224 to uniquely identify a particular network provider system or a particular services provider system (e.g., network provider system 110-1, 110-2, services provider system 170-1, 170-2, etc.).

In an embodiment, the profile consumer's profile identifier may be created and assigned by one or more profile consumer systems (e.g., profile consumer system 164-1, etc.) to uniquely identify the end user (e.g., end user 108-1, 108-2, 108-3, etc.) within the profile consumer systems. Thus, the identifier may be a unique identifier within its respective profile consumer system but not necessarily unique across multiple profile consumer systems. In an embodiment, each end user's anonymized profile identifier may be associated with one or more profile consumer's profile identifiers. In an embodiment, each profile consumer's profile identifier may be associated with a profile consumer identifier, where each profile consumer identifier may be a unique identifier created and assigned by the identifier management component 224 to uniquely identify a particular profile consumer system (e.g., profile consumer system 164-1, etc.).

In an embodiment, the permissions profile datastore 124-2 may be configured to store permissions profile information for each end user. The permissions profile information for each end user may also be associated with the anonymized profile identifier. Additionally, the permissions profile information may include one or more permissions attributes and corresponding permissions attributes values. Each permissions attribute within an end user's permissions profile information may correspond to each profile attribute of the user profile information. Each permission profile value may indicate whether to allow or disallow the accessibility of the corresponding profile attribute, so that the end user may selectively grant or deny access of each profile attribute of his or her respective user profile information by the profile consumer systems 164. As further discussed with respect to at least FIG. 2, a permitted use gatekeeper application (e.g., permitted use gatekeeper application 126-1, 126-2, etc.) deployed within the one or more network provider systems and/or services provider systems may be configured to: (1) filter user profile information for one or more end users based on the permissions profile information for the end user; and (2) generate permitted profile information based on the filtering of the end user's user profile information.

In an embodiment, the permissions profile information may further include access recipients information, access purpose information and access duration information and/or the like. The access recipients information may define a set of one or more profile consumer systems 164 (e.g., "Facebook," "Twitter," "LinkedIn," "Pinterest," "Admob," "Open Mediaworks," "Unity Ads," Chartboost," "Applovin," "MobileCore," etc.) that may access the end user's permitted profile information. For example, the access recipients information for each end user may include, without limitation, one or more recipient attributes, where each recipient attribute may identify a particular profile consumer system by its profile consumer identifier. Each recipient attribute may also be associated with a recipient attribute value indicating whether to allow or disallow access for that particular consumer system identified by its profile consumer identifier.

In an embodiment, the access purpose information may define a purpose for which the permitted profile information may be used by the one or more profile consumer systems 164. The purpose may define a set of one or more purposes such as search engine related purposes, advertising related purposes (e.g., video, rich media, sponsored, banner, etc.), mobile messaging purposes, and/or the like. For example, the access purpose information for each end user may include, without limitation, one or more purpose attributes, where each purpose attribute may identify for what purpose (e.g., "Search Engines," "Banner Ads," "Video Ads," etc.) a profile consumer system may use an end user's permitted profile information. Each purpose attribute may also be associated with a purpose attribute value indicating whether to allow or disallow such purpose as identified by the purpose attribute.

In an embodiment, the access duration information may define the amount of time or a number of times the permitted profile information may be accessible by the one or more profile consumer systems 164. For example the access duration information may define a future date and time that the end user's permitted profile information will no longer be accessible by any profile consumer system.

In an embodiment, the user account datastore 124-3 may be configured to store user account information for each end user. The user account information may include, without limitation, user authentication information (e.g., a user name and password, etc.) and associated anonymized profile identifier. The user account information may be utilized to log in an end user into the privacy services system 160.

Figure 2:
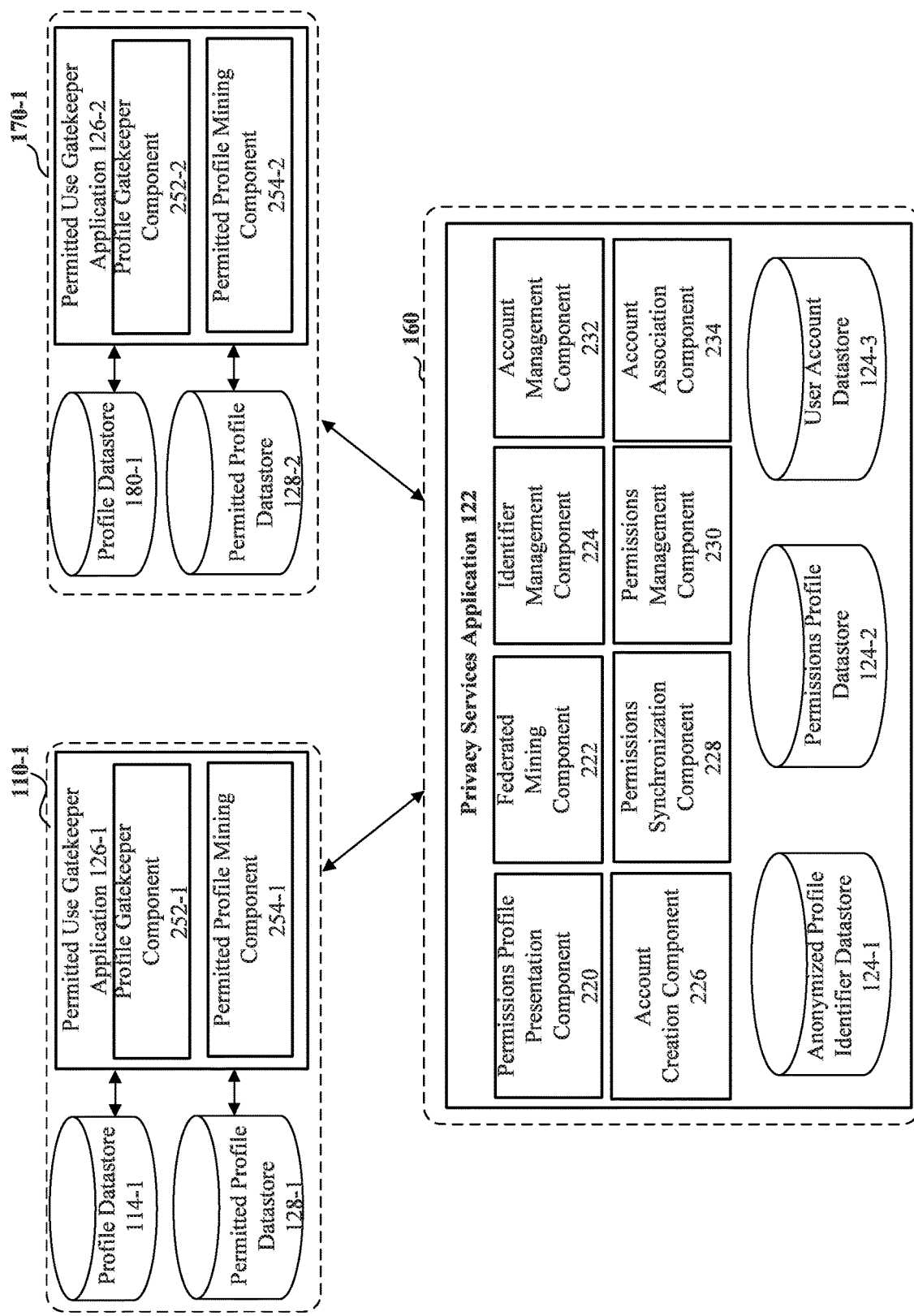
FIG. 2 illustrates various components of a privacy services system in an example embodiment.

FIG. 2 illustrates various components of a privacy services system in an example embodiment. In the example embodiment and to enable an end user of user device 104-1 to manage his or her permissions profile and limit access to his or her user profile information within the network provider system 110-1 and services provider system 170-1, the privacy services system 160 may include the privacy services application 122, the anonymized profile identifier datastore 124-1, the permissions profile datastore 124-2, and user account datastore 124-3, all operatively and/or communicatively coupled to each other within the privacy services system 160. In the example embodiment, the privacy services application 122 may further include, without limitation, a permissions profile presentation component 220, a federated mining component 222, an identifier management component 224, an account creation component 226, a permissions synchronization component 228, a permissions management component 230, an account management component 232, and an account association component 234.

In an embodiment, the permissions profile presentation component 220 may be operatively and/or communicatively coupled to the client permissions application 106-1 and configured to enable end users to request management of their permissions profile in order to control the scope of user profile information that may be accessible by the profile consumer system 164. The permissions profile presentation component 220 may also be configured to enable end users to view and modify their associated permissions profile by providing permissions profile information to the client permissions application 106-1 for visual presentation on a display coupled to an end user's user device 104-1.

In an embodiment, the federated mining component 222 may be operatively and/or communicatively coupled to the profile consumer application 142-1 and configured to receive a profile consumer's federated search requests from the profile consumer application 142-1, which may include at least one profile search criteria. In an embodiment, the federated mining component 222 may also be operatively and/or communicatively coupled to the permitted use gatekeeper applications 126-1 and 126-2 and configured to search the network provider system 110-1 and the services provider system 170-1 for permitted profile information that matches the at least one profile search criteria. The federated mining component 222 may be further configured to transmit a federated search response based on the search results received from the network provider system 110-1 and/or the services provider system 170-1 to the profile consumer application 142-1. The federated search response may include a list of profile consumer's profile identifiers representative of end users having user profiles that match the at least one profile search criteria.

Optionally, in order to provide incentives for end users 108 to allow access to their user profile information, the federated mining component 222 may further transmit notifications to the respective network provider systems and/or services provider systems associated with the end users 108 (identified by the respective provider's profile identifiers) who have user profile information that: (1) matches the profile search criteria, and (2) their corresponding profile consumer's profile identifiers were subsequently transmitted to the profile consumer system in a federated search response. The respective network provider system (e.g., mobile telecommunications carrier such as Verizon, Orange, Vodafone, AT&T, etc.) may then provide discounts and/or incentives on services and/or products they may provide to those end users (e.g., discount on services associated with the end user's user devices 104 such as discount on mobile phone services, earlier trade in of the end user's user devices 104 such as mobile phones, etc.). Similarly, the respective services provider systems (e.g., autonomous vehicle and/or automotive support services systems such as those managed by Tesla, GM, Ford, Audi, Mercedes Benz and such as those managed by OnStar, LoJack, etc.) may also provide discounts and/or incentives on services and/or product they may provide to those end users (e.g., extension of time for in-vehicle GPS navigation, discounted GPS map updates, discounted in-vehicle security services, discounted remote diagnostics services, etc.).

In an embodiment, the identifier management component 224 may be operatively and/or communicatively coupled to the anonymized profile identifier datastore 124-1 and configured to manage the relationship and associations between an end user's anonymized profile identifier, a provider's profile identifier, a provider identifier, a profile consumer's profile identifier, and a profile consumer identifier stored within the anonymized profile identifier datastore 124-1. In an embodiment, the end user's anonymized profile identifier may be a unique identifier created and assigned by the identifier management component 224 to uniquely identify the end user within the privacy services system 160.

In an embodiment, the account creation component 226 may be operatively coupled and/or communicatively coupled to the permissions profile presentation component 220, the identifier management component 224, and permissions management component 230 to receive requests to create a user account for an end user including the creation and storage of related identifiers, tokens, and their associations.

In an embodiment, permissions synchronization component 228 may be operatively and/or communicatively coupled to the permitted use gatekeeper applications 126-1 and 126-2 and permissions management component 230 and configured to receive notifications regarding updates to an end user's permissions profile information and in response, synchronize at least one permitted profile datastore (e.g., permitted profile datastores 128-1 and 128-2, etc.) based on the end user's updated permissions profile information.

In an embodiment, the permissions synchronization component 228 may be configured to synchronize the at least one permitted profile datastore in response to receiving a set number (e.g., ten (10), twenty (20), one hundred (100), etc.) of one or more notifications. Additionally or alternatively, the synchronization may also be performed on a periodic basis by the permissions synchronization component 228 (e.g., every hour, every four (4) hours, every twelve (12) hours, etc.). Additionally or alternatively, the permissions synchronization component 228 may be further configured to synchronize based on access duration information associated with end users 108 on a periodic basis (every twelve (12) hours, every twenty four (24) hours, etc.).

Additionally or alternatively to improve filtering efficiency, the permissions synchronization component 228 may be configured to synchronize the at least one permitted profile datastore based on one or more provider systems' (e.g., network provider systems 110-1 and/or services provider system 170-1) service level objectives as defined by service level agreements associated with the provider systems. The service level objectives may include, without limitation, at least one time period to access the user profile datastore, maximum data throughput during the at least one time period of access, maximum frequency of access during the at least one time period of access, and/or the like. The permissions synchronization component 228 and corresponding permitted use gatekeeper application may access each provider system's user profile datastore (e.g., permitted use gatekeeper application 126-1 accessing user profile datastore 114-1, etc.) in accordance with the at least one service level objective so as to reduce network and processing loads during peak time periods and thereby, increasing overall efficiency.

In an embodiment, the permissions management component 230 may be operatively and/or communicatively coupled to the permissions profile presentation component 220, the permissions profile datastore 124-2, and the permissions synchronization component 228 and configured to retrieve an end user's permissions profile information and provide the permissions profile information to the permissions profile presentation component 220. Additionally, the permissions management component 230 may also be configured to modify an end user's permissions profile information based on modifications made by the end user and send notifications to the permissions synchronization component 228 regarding modifications to an end user's permissions profile information.

In an embodiment, the account management component 232 may be operatively and/or communicatively coupled to the account creation component 226 and configured to create user accounts within the privacy services system 160 based on at least a portion of an end user's provided user authentication information. Additionally, the account management component 232 may be further operatively and/or communicatively coupled to the account association component 234 and configured to authenticate the end user.

In an embodiment, the account association component 234 may be operatively and/or communicatively coupled to the permissions profile presentation component 220, account management component 232, and identifier management component 224 and configured to associate an end user's user account of the privacy services system 160 with one or more network provider systems 110 and/or services provider systems 170. It may be appreciated that by associating an end user's user account within the privacy services system 160 with multiple network provider systems 110 and/or services provider systems 170, the end user may manage and control his or her user profile information across these multiple network provider systems 110 and/or services provider systems 170.

In an embodiment, the permitted use gatekeeper application 126-1 may include, without limitation, a profile gatekeeper component 252-1 and permitted profile mining component 254-1. The permitted use gatekeeper application 126-1 may be generally configured to filter user profile information stored in the user profile datastore 114-1 in accordance with an end user's permissions profile control. Moreover, the profile gatekeeper component 252-1 may be configured to access the profile datastore 114-1 and receive a permitted profile synchronization request from the privacy services application 122 to synchronize the user profile information stored in profile datastore 114-1.

In an embodiment, the permitted profile synchronization request may include, without limitation, a provider's profile identifier assigned by a network provider system 110-1 and permissions profile information for an end user of the network provider system 110-1 and the privacy services system 160. In response, profile gatekeeper component 252-1 may be configured to: (1) filter the user profile information identified by the provider's profile identifier, (2) generate permitted profile information based on the user profile information and permissions profile information, and (3) store the generated permitted profile information in the permitted profile datastore 128-1.

In an embodiment and to filter the user profile information stored in a user profile datastore based on each end user's permissions profile control, profile gatekeeper component 252-1 may be further configured to interface with an API associated with the user profile datastore that may be specific or unique to each network provider system. The profile gatekeeper component 252-1 may also be configured to use the network provider specific API to extract a limited set of user profile information and transform the extracted user profile information to a domain specific ontology specifically configured for storing user profile information. The extracted user profile information, which may represent permitted profile information, is then stored in the respective permitted profile datastore 128-1 within the network provider system 110.

For example, to extract and store the limited set of user profile information as the permitted profile information, the profile gatekeeper component 252-1 may extract and store profile attributes and associated profile attribute values that the end user has indicated to be accessible as defined by the end user's permissions profile information. Thus, the profile gatekeeper component 252-1 may extract and store a particular profile attribute and its associated profile attribute value, when the end user's permissions attribute and associated permissions attribute value corresponding to that particular profile attribute indicates that the end user has allowed access to that particular profile attribute and its associated profile attribute value. Otherwise, the profile gatekeeper component 252-1 may not extract and store the particular profile attribute.

In an embodiment, the permitted profile mining component 254-1 may be configured to receive a profile search request from the privacy services application 122, the profile search request may include the at least one profile search criteria and the permitted profile mining component 254-1 may be configured to search the permitted profile datastore 128-1 for end users of the network provider system 110-1 that match the at least one profile search criteria in the respective profile search request. The permitted profile mining component 254-1 may be further configured to generate a profile search response based on the search. The profile search response may include, without limitation, a search result list of provider's profile identifiers having corresponding permitted profile information determined based on the search. The permitted profile mining component 254-1 may then transmit the profile search response to the privacy services application 122.

In an embodiment, the permitted use gatekeeper application 126-2 may include, without limitation, a profile gatekeeper component 252-2 and permitted profile mining component 254-2. Similar to permitted use gatekeeper application 126-1, the permitted use gatekeeper application 126-2 may also be generally configured to filter user profile information stored in one or more user profile datastores (e.g., user profile datastore 180-1) in accordance with an end user's permissions profile control. Moreover, the profile gatekeeper component 252-2 may be configured to access the profile datastore 180-1 and receive a permitted profile synchronization request from the privacy services application 122 to synchronize the user profile information stored in profile datastore 180-1.

In an embodiment, the permitted profile synchronization request may include, without limitation, a provider's profile identifier assigned by a network provider system 110-1, permissions profile information for an end user of the services provider system 170-1 and the privacy services system 160. In response, profile gatekeeper component 252-2 may be configured to filter the user profile information identified by the provider's profile identifier, generate permitted profile information based on the user profile information and permissions profile information and store the generated permitted profile information in the permitted profile datastore 128-2.

In an embodiment and to filter the user profile information stored in a user profile datastore based on each end user's permissions profile control, profile gatekeeper component 252-2 may be further configured to interface with an API associated with the user profile datastore that may be specific or unique to each provider system (e.g., unique to services provider system 170-1). The profile gatekeeper component 252-2 may also be configured to use the service provider specific API to extract a limited set of user profile information and transform the extracted user profile information to a domain specific ontology specifically configured for storing user profile information. The extracted user profile information, which may represent permitted profile information, is then stored in the respective permitted profile datastore 128-2 within the services provider system 170-1.

For example, to extract and store the limited set of user profile information as the permitted profile information, the profile gatekeeper component 252-2 may extract and store profile attributes and associated profile attribute values that the end user has indicated to be accessible as defined by the end user's permissions profile information. Thus, the profile gatekeeper component 252-2 may extract and store a particular profile attribute and its associated profile attribute value, when the end user's permissions attribute and associated permissions attribute value corresponding to that particular profile attribute indicates that the end user has allowed access to that particular profile attribute. Otherwise, the profile gatekeeper component 252-1 may not extract and store the particular profile attribute.

In an embodiment and similar to the permitted profile mining component 254-1, the permitted profile mining component 254-2 may be configured to receive a profile search request from the privacy services application 122, the profile search request may include the at least one profile search criteria and the permitted profile mining component 254-2 may be configured to search the permitted profile datastore 128-2 for end users of the network provider system 110-2 that matches the at least one profile search criteria in the respective profile search request. In an embodiment, the permitted profile mining component 254-2 may be further configured to generate a profile search response based on the search. The profile search response may include, without limitation, a search result list of provider's profile identifiers having corresponding permitted profile information determined based on the search. The permitted profile mining component 254-2 may then transmit the profile search response to the privacy services application 122.

While not explicitly illustrated, it may be appreciated that the profile gatekeeper component 252-2 may be configured to access user profile information stored in the profile datastore 180-1 in a manner that is different than the access of user profile information performed by profile gatekeeper component 252-1. These differences may arise due to differences in technical implementations of each network provider systems 110 such as differences in access protocols (e.g., different APIs, etc.), differences in internal datastore structures (e.g., structured versus unstructured databases, flat file versus relational databases, etc.), differences in definition of keys and values, and/or the like. Thus, user profile information (e.g., date of birth, gender, geo-location, etc.) stored in user profile datastore 114-1 may be referenced and/or accessed differently than user profile datastore 180-1.

As such and in those embodiments, the profile gatekeeper component 252-1 may be specifically configured to access the profile datastore 114-1 (or other datastores) of network provider system 110-1 in accordance with access protocols, internal datastore structures, and key/value definitions associated with the profile datastore 114-1. Similarly, in an embodiment, the profile gatekeeper component 252-2 may be specifically configured to access the profile datastore 180-1 (or other datastores) of services provider system 170-1 in accordance with access protocols, internal datastore structures, and key/value definitions associated with the profile datastore 114-1.

Regardless of the above differences and in an embodiment, the profile gatekeeper component 252-1 and 252-2 may be configured to generate permitted profile information and store the permitted profile information in the respective permitted profile datastores 128-1 and 128-2. The permitted profile information may be referenced by its profile attribute and profile attribute value tuples that is shared between or among both permitted use gatekeeper applications 126-1 and 126-2. The permitted profile datastores 128-1 and 128-2 may also be configured to store the permitted profile information in a domain specific ontology that is common or shared between multiple network provider systems 110 and services provider systems 170. Stated differently, the permitted profile datastores 128-1 and 128-2 may store the permitted profile information for each end user in a provider system agnostic ontology that is common across multiple network provider systems 110 and services provider systems 170.

It may be appreciated that by restricting the filtering and storage of permitted profile information to only server devices within the network provider systems 110 (or services provider systems 170) rather than within a different system or off premises (e.g., within the privacy services system 160, etc.), end users' 108 user profile information and permitted profile information may securely remain within the respective network provider systems 110. It may be further appreciated that by filtering non-permitted data within multiple network provider systems and/or services provider systems 170, the privacy services system 160 may be configured to manage and control an end user's profile information in a network provider system (e.g., network provider system 110-1, etc.) and/or services provider system (e.g., services provider system 170, etc.) with which the end user no longer has an association. Thus, even if the end user's relationship with the network provider has been terminated (e.g., switching to a new network provider system to access the mobile telecommunication services, etc.), the privacy services system 160 would still be able to manage an end user's profile information via the privacy services system 160.

It may be further appreciated that by restricting the filtering of user profile information to one or more provider systems' (e.g., network provider systems 110-1 and/or services provider system 170-1) service level objectives, overall efficiency of the privacy services system 160 (including permitted use gatekeeper applications 126) may be increased. For example, efficiencies related to searching user profile datastores and/or synchronizing the permitted use datastores may be increased to ensure that access to user profile datastores of provider systems do not conflict or otherwise exceed the capabilities of their datastores, which may result in increases in delays in searching and/or filtering user profile information.

Figure 3A:
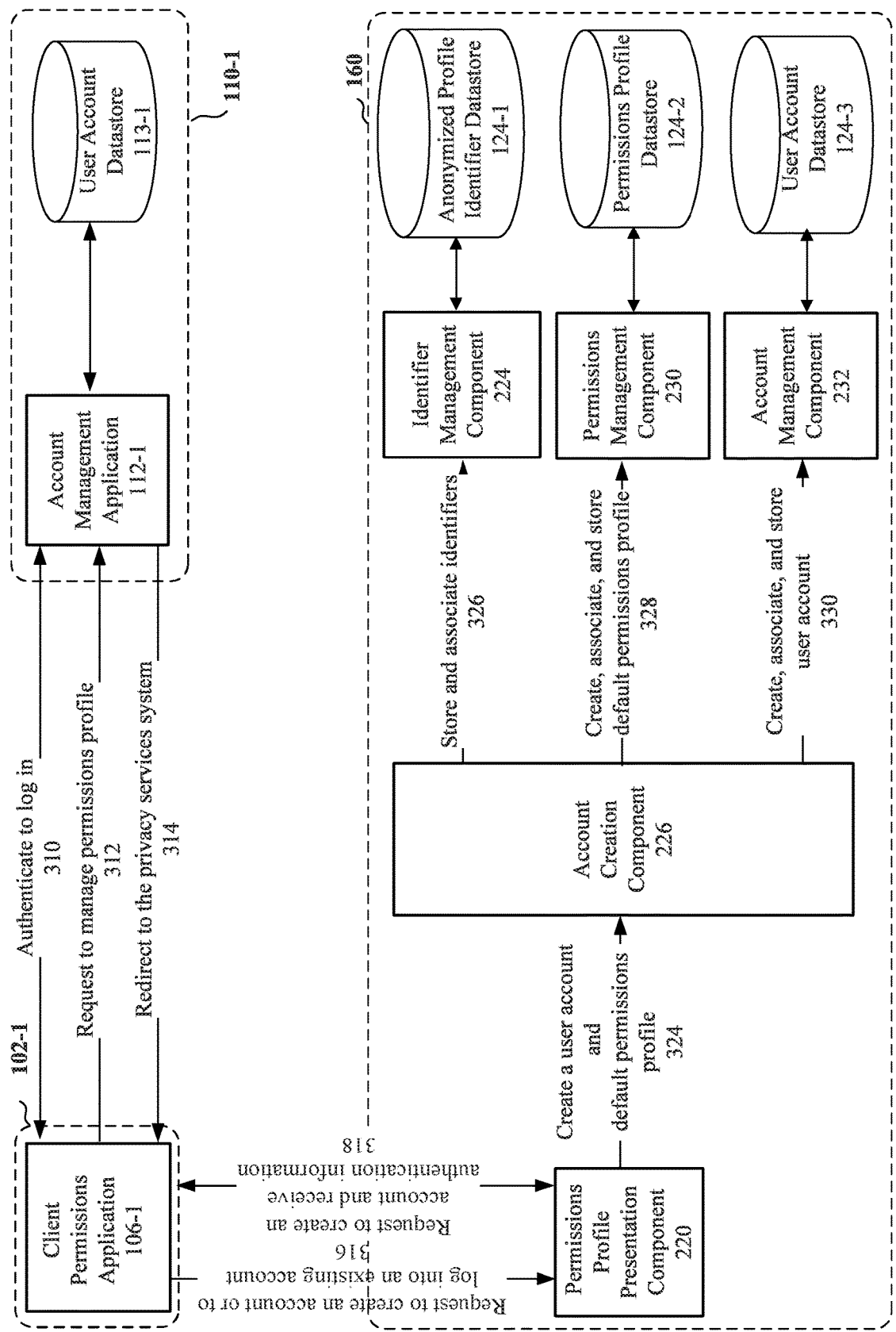
FIGS. 3A-3C illustrate the processing operations that may be performed between various components to enable an end user to control the filtering of his or her non-permitted data according to example embodiments.

FIG. 3A illustrates the processing operations that may be performed between various components to enable an end user to control his or her user permissions with respect to a first network provider system according to an example embodiment. It is to be appreciated that not all steps may be needed to perform the disclosure provided herein. Further, some of the steps may be performed simultaneously, or in a different order than those shown in FIG. 3A, as will be understood by a person of ordinary skill in the art.

In an embodiment at step 310, the end user via the client permission application 160-1 may authenticate to log in. For example, the account management application 112-1 of a first network provider system i.e., network provider system 110-1 may authenticate the end user by requesting and receiving provided authentication information from the client permissions application 106-1 (e.g., a user name and password, etc.). The account management application 112-1 may authenticate the provided authentication information with respect to the user authentication information for an end user stored in the user account datastore 113-1.

In an embodiment at step 312, the end user may request to manage a permissions profile. For example, the account management application 112-1 may request the account management application 112-1 to manage the access of user profile information stored in the user profile datastore 114-1 of the first network provider system 110-1.

In an embodiment at step 314, the account management application 112-1 may redirect to the privacy services system. For example, in response to the request to manage a permissions profile, the account management application 112-1 may transmit a privacy services redirect request to the client permissions application 106-1, where the request may include a privacy services redirect reference (e.g., a URI and/or URL) and a provider's profile identifier associated with the end user.

In an embodiment at step 316, the permissions profile presentation component 220 may receive a request to either create an account or to log in to an existing account. For example, in response to the redirect to the privacy services system at step 314, the permissions profile presentation component 220 may receive either an account creation or login request from the client permissions application 106-1.

In an embodiment at step 318, the permissions profile presentation component 220 may receive a request to create a user account and receive authentication information. For example, the permissions profile presentation component 220 may receive an account creation request to create a user account and receive authentication information (e.g., login name and password, etc.) from an end user via client permissions application 106-1. The account creation request may include, without limitation, a unique identification token that identifies the user device 104-1 or the end user within the network provider system 110-1, and the associated provider's profile identifier. Additionally or alternatively, the account creation request may include the associated provider's profile identifier and the permissions profile presentation component 220 may generate a unique identification token which may then be subsequently transmitted to the client permission application 106-1 to be cached on the user device 104-1.

In an embodiment at step 324, the permissions profile presentation component 220 may request the account creation component 226 to create a user account and default permissions profile. For example, the permissions profile presentation component 220 may transmit an account creation request to the account creation component 226. The account creation request may include, without limitation, the authentication information, the provider's profile identifier, and the unique identification token. In an embodiment and in response to receiving the account creation request, the account creation component 226 may also be configured to generate an anonymized profile identifier.

In an embodiment at step 326, the account creation component 226 may transmit a request to store and associate identifiers. For example, the account creation component 226 may transmit an association and storage request to the identifier management component 224. The association and storage request may include, without limitation, the anonymized profile identifier, the provider's profile identifier, and the unique identification token. In response to the association and storage request, the identifier management component 224 may be configured to: (1) associate the anonymized profile identifier with the provider's profile identifier; (2) associate the provider's profile identifier with the provider identifier identifying network provider system 110-1; and (3) store the identifiers and the relationships within the anonymized profile identifier datastore 124-1. Additionally, the identifier management component 224 may also be configured to: (1) associate the unique identification token with the anonymized profile identifier; and (2) store the unique identification token with its associated anonymized profile identifier and the relationship as a token and anonymized identifier tuple within the anonymized profile identifier datastore 124-1.

In an embodiment at step 328, the account creation component 226 may optionally transmit a request to create, associate, and store a default permissions profile. For example, the account creation component 226 may transmit a permissions profile creation request to the permissions management component 230. The permissions profile creation request may include, without limitation, the anonymized profile identifier. In response to the permissions profile creation request, the permissions management component 230 may optionally be configured to: (1) create default permissions profile information, (2) associate the default permissions profile with the anonymized profile identifier, and (3) store the anonymized profile identifier, the default permissions profile information, and the relationships within the permissions profile datastore 124-2.

In an embodiment at step 330, the account creation component 226 may transmit a request to create, associate, and store a user account. For example, the account creation component 226 may transmit an account creation request to the permissions management component 230. The account creation request may include, without limitation, the authentication information and the anonymized profile identifier. In response to the account creation request, the account management component 232 may be configured to: (1) create a new user account with the provided authentication information, (2) associate the authentication information with the anonymized profile identifier, and (3) store the authentication information (or a hashed version of the authentication information), the anonymized profile identifier, and the relationship within the user account datastore 124-3.

It may be appreciated that while example embodiment of FIG. 3A has been discussed with respect to a network provider system 110-1, the example embodiment is not so limited in this context. For example, the network provider system 110-1 may be replaced by any particular one of the one or more services provider systems 170 (e.g., a services provider system 170-2 representative of a automotive support services provider), as discussed above in FIG. 1A.

Figure 3B:
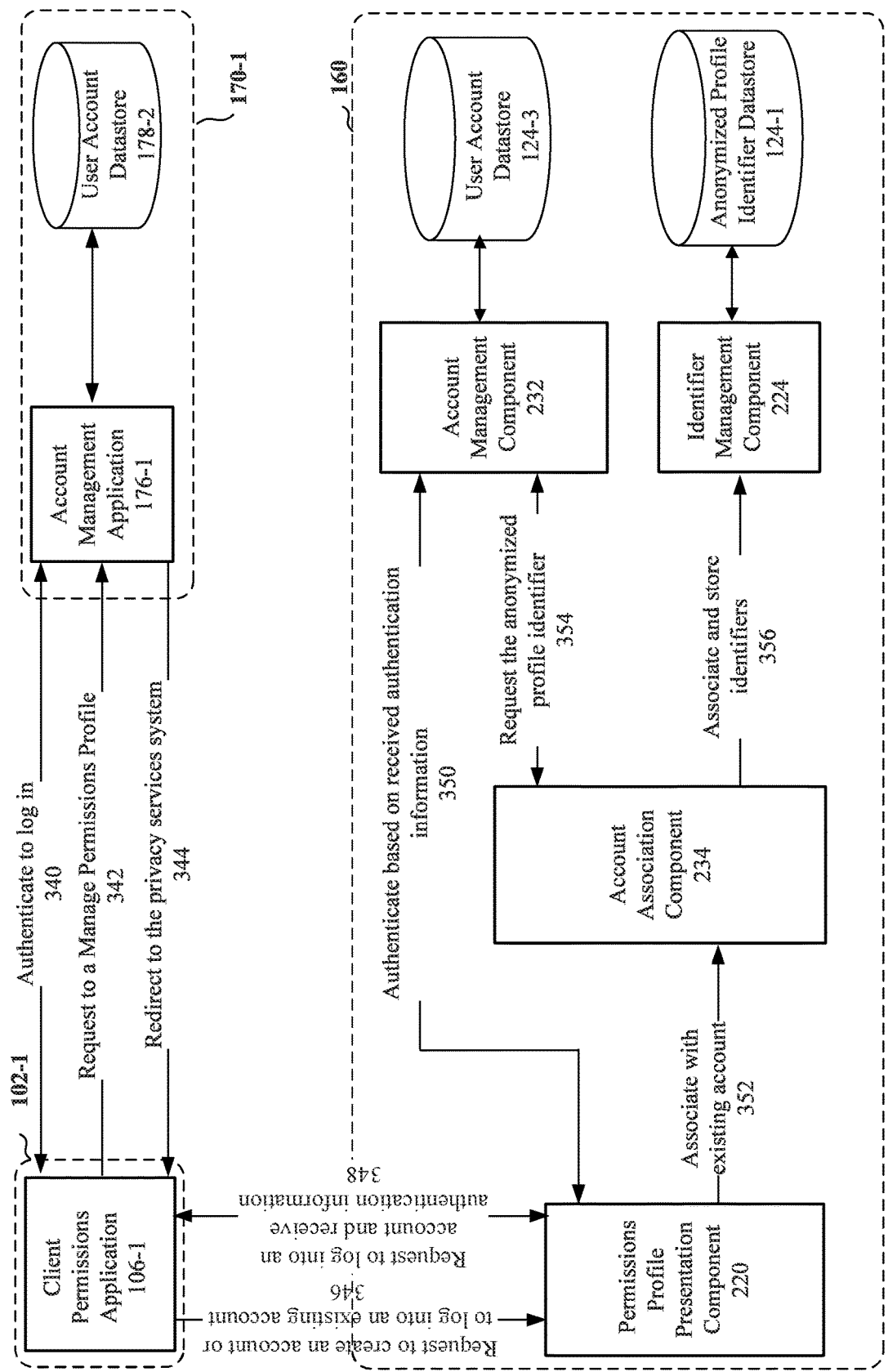

FIG. 3B illustrates the processing operations that may be performed between various components to enable an end user to control his or her user permissions with respect to a second network provider system according to an example embodiment. It is to be appreciated that not all steps may be needed to perform the disclosure provided herein. Further, some of the steps may be performed simultaneously, or in a different order than those shown in FIG. 3B, as will be understood by a person of ordinary skill in the art.

In an embodiment at step 340, the end user via the client permission application 160-1 may authenticate to log in. For example, the account management application 176-1 of a services provider system (i.e., services provider system 170-1) may authenticate the end user by requesting and receiving provided authentication information from the client permissions application 106-1 (e.g., a user name and password, etc.). The account management application 176-1 may authenticate the provided authentication information with respect to the user authentication information for an end user stored in the user account datastore 178-2.

In an embodiment at step 342, the end user may request to manage a permissions profile. For example, the client permissions application 106-1 may request the account management application 176-1 to manage the access of user profile information stored in the user profile datastore 180-1 of services provider system 170-1.

In an embodiment at step 344, the account management application 176-1 may redirect to the privacy services system. For example, in response to the request to manage the permissions profile, the account management application 176-1 may transmit a privacy services redirect request to the client permissions application 106-1, where the request may include a privacy services redirect reference (e.g., a URI and/or URL) and a provider's profile identifier associated with the end user for the services provider system (i.e., services provider system 170-1).

In an embodiment at step 346, the permissions profile presentation component 220 may either receive a request to create an account or to log into an existing account. For example, in response to the redirect to the privacy services system at 344, the permissions profile presentation component 220 may receive an account creation or login request from the client permissions application 106-1.

In an embodiment at step 348, the permissions profile presentation component 220 may receive a request to log into an account and receive authentication information. For example, the permissions profile presentation component 220 may receive an account login request to log into an existing user account in the privacy services system 160 and receive authentication information (e.g., login name and password, etc.) from end user 108-1 via client permissions application 106-1. The account login request may include, without limitation, a unique identification token that identifies the user device 104-1 or the end user within services provider system 170-1, and the provider's profile identifier for the services provider system (i.e., network provider system 170-1). Additionally or alternatively, the account login request may include the associated provider's profile identifier and the permissions profile presentation component 220 may generate a unique identification token which may then be subsequently transmitted to the client permission application 106-1 to be cached on the user device 104-1.

In an embodiment at step 350, the permissions profile presentation component 220 may transmit a request to authenticate based on received authentication information. For example, the permissions profile presentation component 220 may transmit an authentication request to the account management component 232 to authenticate the end user based on received authentication information. The authentication request may include, without limitation, the authentication information (e.g., login name and password, etc.) of the end user 108-1.

In an embodiment at step 352, the permissions profile presentation component 220 may request to associate with an existing account. For example, the permissions profile presentation component 220 may transmit an account association request to the account association component 234. The account association request may include, without limitation, the authentication information, the provider's profile identifier, and the unique identification token.

In an embodiment at step 354, the account association component 234 may request the anonymized profile identifier. For example, the account association component 234 may transmit an anonymized profile identifier request to the account management component 232 to retrieve the anonymized profile identifier for the end user 108-1 having the associated authentication information. The anonymized profile identifier request may include, without limitation, the authentication information (e.g., login name and password, etc.) of the end user 108-1.

In an embodiment at step 356, the account association component 234 may transmit a request to associate and store identifiers. For example, the account association component 234 may transmit an association and storage request to the identifier management component 224. The association and storage request may include, without limitation, the anonymized profile identifier, the provider's profile identifier, and the unique identification token. The association and storage request may request the identifier management component 224 to: (1) associate the anonymized profile identifier with the provider's profile identifier for the services provider system 170-1, (2) associate the provider's profile identifier of services provider system 170-1 with the provider identifier identifying services provider system 170-1, and (3) associate the unique identification token with the anonymized profile identifier, and store the identifiers, the unique identification token, and the relationships within the anonymized profile identifier datastore 124-1.

It may be appreciated that while the example embodiment in FIG. 3B has been discussed with respect to a services provider system 170-1, the example embodiment is not so limited in this context. For example, the services provider system 170-1 may be replaced by any particular one of the one or more network provider systems 110 (e.g., a network provider system 110-2 representative of an internet services provider), as discussed above in FIG. 1A.

Figure 3C:
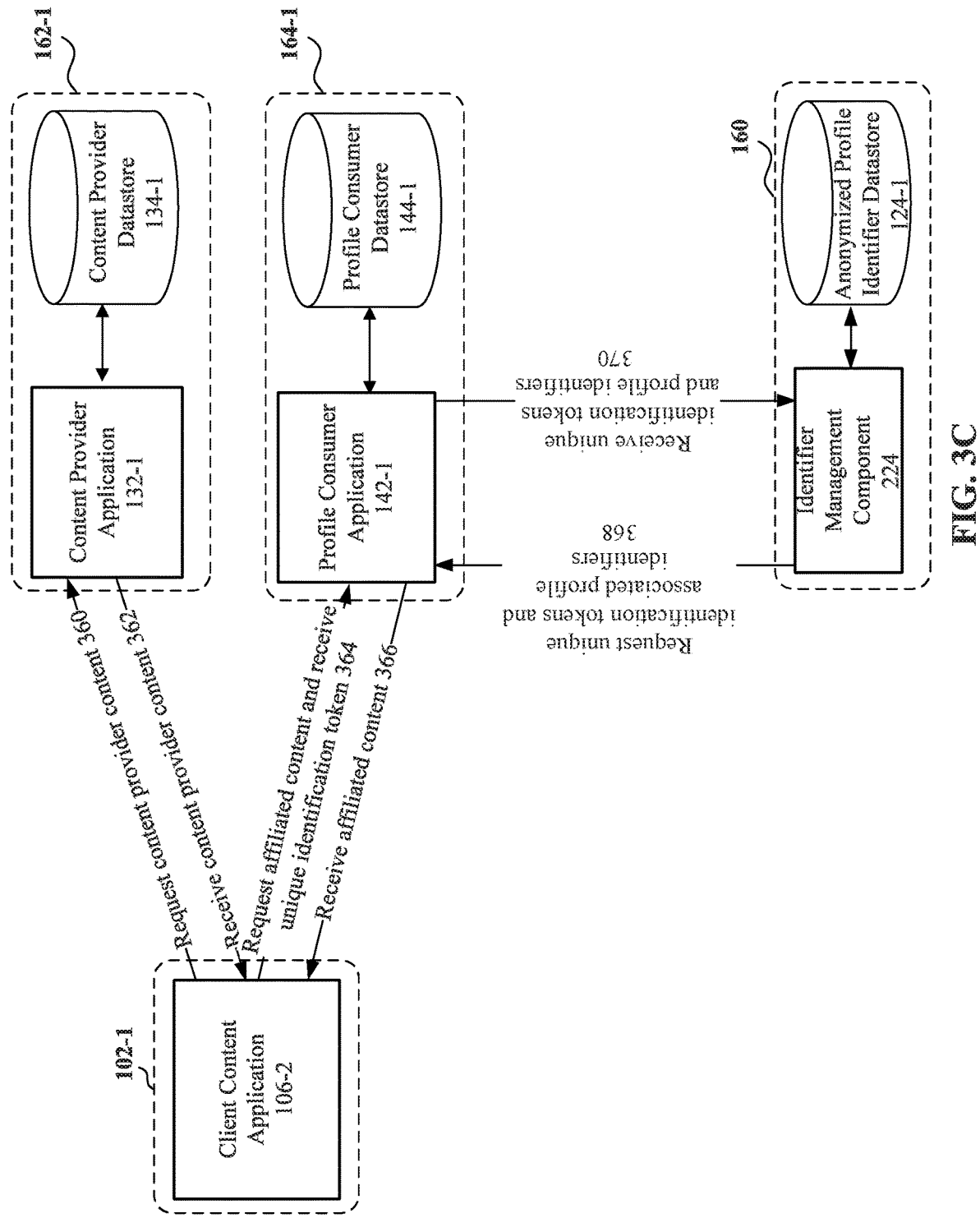

FIG. 3C illustrates the processing operations that may be performed among and between various components to enable the privacy services system to associate an anonymized profile identifier for an end user with respect to a profile consumer's profile identifier assigned to the end user according to an example embodiment. It is to be appreciated that not all steps may be needed to perform the disclosure provided herein. Further, some of the steps may be performed simultaneously, or in a different order than those shown in FIG. 3C, as will be understood by a person of ordinary skill in the art.

In an embodiment and at step 360, the client content application 106-2 may request content. For example, the client content application 106-2 may request content from the content provider application 132-1 by transmitting a content request to the content provider application 132-1 to access content stored in the content provider datastore 134-1. The content request may include, without limitation, one or more content references (e.g., URIs and/or URLs) identifying the requested content.

In an embodiment and at step 362, the client content application 106-2 may receive the requested content. For example, in response to a transmitted content request, the client content application 106-2 may receive a requested content response from the content provider application 132-1. The requested content response may include, for example, streaming videos from a web page, where the web page may further include one or more affiliated content references. The one or more affiliated content references may configure the client content application 106-2 to request affiliated content from the profile consumer application 142-1.

In an embodiment and at step 364, the client application may request affiliated content and transmit unique identification token. For example, the client application 106-2 may request affiliated content and provide a unique identification token by transmitting an affiliated content request to the profile consumer application 142-1. The affiliated content request may include, without limitation, one or more affiliated content references that identify the affiliated content stored in the profile consumer datastore 144-1. Additionally, the transmitted request may also include, without limitation, a unique identification token associated with the user device 104-1 and/or the end user of the user device 104-1. The unique identification token may be added to the affiliated content request by the client content application 106-2 and/or the network provider system 110-1.

While not illustrated it may be appreciated that for each affiliated content request received from each client content application, the profile consumer application 142-1 may be configured to: (1) store any received unique identification tokens associated with each content request; and (2) generate and associate a profile consumer's profile identifier with each unique identification token. The profile consumer application 142-1 may also store each unique identification token and its associated profile consumer's profile identifier in the profile consumer datastore 144-1.

In an embodiment and at step 366, the identifier management component 224 may receive the affiliated content. For example, the client content application 106-2 may receive affiliated content from the profile consumer application 142-1 by receiving an affiliated content response from the profile consumer application 142-1, where the affiliated content response may include, without limitation, the affiliated content.

In an embodiment and at step 368, the identifier management component 224 may request unique identification tokens and associated profile consumer's profile identifiers. For example, the identifier management component 224 may be configured to request unique identification tokens and associated profile consumer's profile identifiers by transmitting a token and profile identifiers request to the profile consumer application 142-1.

In an embodiment and at step 370, the identifier management component 224 may receive unique identification tokens and associated profile consumer's profile identifiers. For example, the identifier management component 224 may receive unique identification tokens and associated profile consumer's profile identifiers by receiving a tokens and profile identifiers response from the profile consumer application 142-1, in response to the tokens and profile identifiers request. The tokens and identifiers response may include a set of one or more token and profile identifier tuples, where each token and profile identifier tuple may include a unique identification token and its associated profile consumer's profile identifier.

Additionally or alternatively, instead of receiving the tokens and profile identifiers response in response to a request, the identifier management component 224 may be configured to periodically receive one or more tokens and profile identifiers responses, without transmitting any request to the profile consumer application 142-1. To ensure communication privacy and security between the identifier management component 224 and the profile consumer application 142-1, communications between the identifier management component 224 and the profile consumer application 142-1 may be encrypted utilizing a secure and encrypted communications protocol (e.g., TLS, SSL, etc.).

In response to receiving the tokens and identifiers response, the identifier management component 224 may be configured to: (1) generate and associate a profile consumer identifier that identifies the profile consumer system 164-1 with each received profile consumer's profile identifier; and (2) store each of the received unique identification token, its associated profile consumer's profile identifier, the generated profile consumer identifier and its relationships as token and profile identifier tuples in the anonymized profile identifier datastore 124-1.

In response to the one or more the tokens and profile identifiers responses or on a periodic basis (e.g., every one (1) hour, every twelve (12) hours, every twenty four (24) hours, etc.), the identifier management component 224 may be configured to: (1) identify a token and anonymized identifier tuple and a token and profile identifier tuple having matching unique identification tokens; (2) for each matching set of tuples, associate the anonymized profile identifier of the token and anonymized identifier tuple with the profile consumer's profile identifier of the token and profile identifier tuple; (3) associate the profile consumer's profile identifier of the token and profile identifier tuple with the profile consumer identifier of the token and profile identifier tuple; and (4) store the anonymized profile identifier, the profile consumer's profile identifier, the profile consumer identifier and its relationships in the anonymized profile identifier datastore 124-1. Additionally, the identifier management component 224 may be configured to remove the token and profile identifier tuple and/or the token and anonymized identifier tuple having matching unique identification tokens stored in the anonymized profile identifier datastore 124-1 after steps (1)-(4) discussed immediately above have been performed.

It may be appreciated that while FIG. 3C illustrates only one example embodiment used to associate the anonymized profile identifier with a profile consumer's profile identifier for an end user, the example embodiment is not so limited to this context. For example, the unique identification token may be a unique identifier (e.g., a web browser cookie, etc.) associated with and/or assigned by the privacy services system 160 (e.g., privacy services system 160, etc.), which may be cached on the user device (e.g., user device 104-1, etc.), when the user device was used to create or associate a user account as discussed in FIGS. 3A and 3B.

Continuing with the above example, a beacon component associated with privacy services system 160 may be transmitted to a user device (e.g., user device 104-1, etc.) for execution by the user device via the client content application (e.g., client content application 106-2, etc.) when accessing the requested content (e.g., a web browser executing the streaming video web page including a beacon-to-server call). The beacon component may also transmit a request to the profile consumer system (e.g., profile consumer system 164-1, etc.) to provide its profile consumer's profile identifier associated with the unique identification token, where the request may include, without limitation, a unique identification token previously cached on the user device. In response, the profile consumer's system may transmit tokens and profile identifiers response to the identifier management component 224, which may include a profile consumer's profile identifier and the unique identification token assigned by the privacy services system 160 and cached on the user device.

Figure 4:
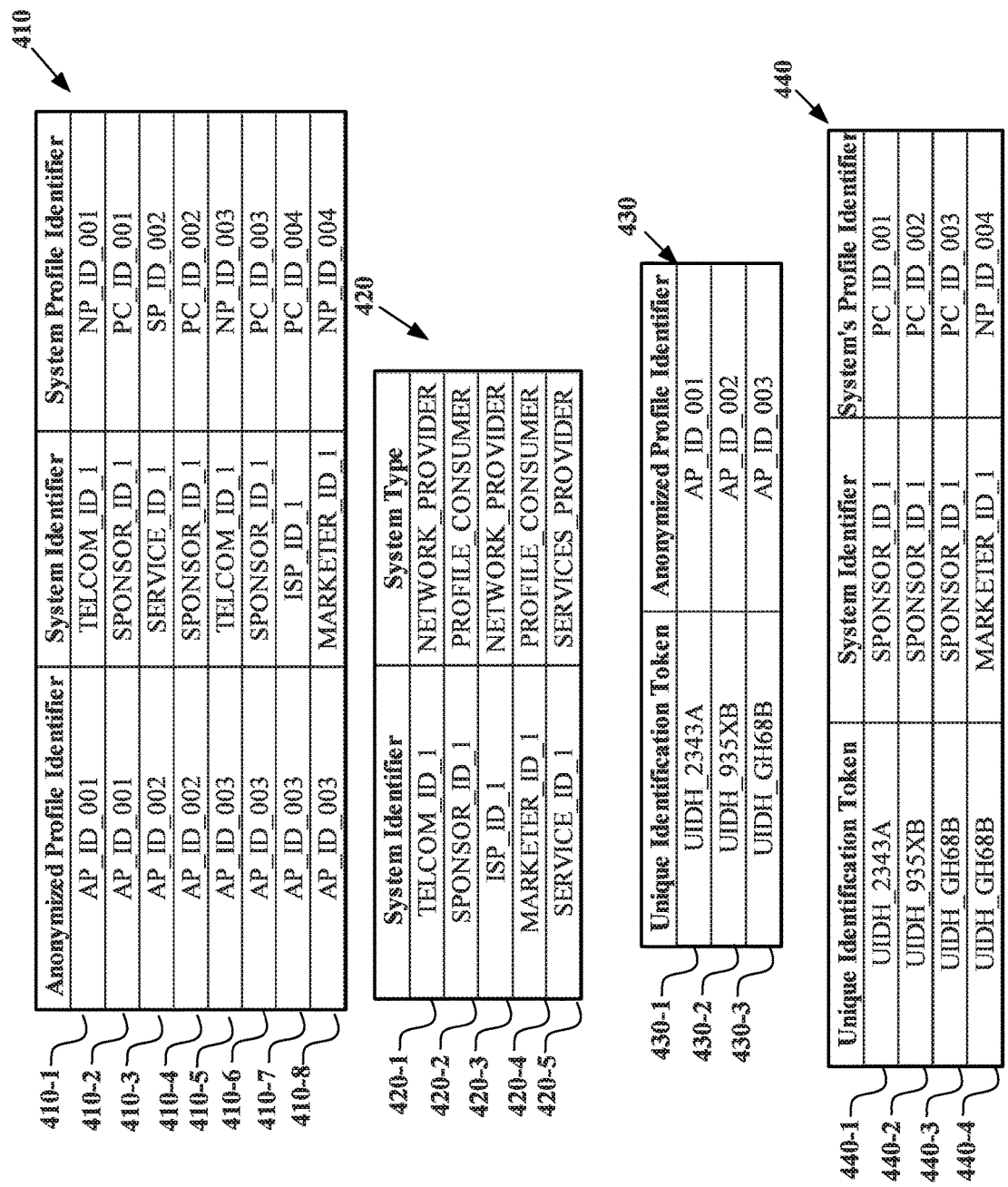
FIG. 4 illustrates various identifiers, tokens, and its associations that may be stored in the anonymized profile identifier datastore according to an example embodiment.

FIG. 4 illustrates the various identifiers, tokens, and their associations stored in the anonymized profile identifier datastore 124-1 according to an example embodiment. In the example embodiment, the various identifiers, tokens, and their associations for one or more end users may be separately stored in four tables 410, 420, 430, and 440 as illustrated. However, it may be appreciated that at least a portion of the anonymized profile information may be combined into one or more tables and/or reorganized in separate tables.

In an embodiment, table 410 may include one or more rows or tuples that store and define relationships between each end user's anonymized profile identifiers with respect to system identifiers and system profile identifiers. In an embodiment, an end user's anonymized profile identifier may be associated with a system identifier that identifies a particular system (e.g., network provider system, services provider system, profile consumer system, etc.), and the system identifier may further be associated with a system profile identifier that is used by the particular system to identify the same end user and associated user profile information within that particular system.

In an embodiment, table 420 may include one or more rows or tuples that store and define the relationship between each system identifier and its associated system type. In an embodiment, each system identifier that identifies a particular system may also be associated with a system type that identifies whether the system is a network provider system (i.e., "NETWORK_PROVIDER,"), a services provider system (i.e., "SERVICES_PROVIDER"), a profile consumer system (i.e., "PROFILE_CONSUMER") and/or the like.

In an embodiment, tuples of table 410 in combination with tuples of table 420 may identify and define the relationships between an end user's anonymized profile identifier and its associated provider's profile identifier and provider identifier. For example, tuple 410-1 of table 410 in combination with tuple 420-1 of table 420 illustrates an anonymized profile identifier (i.e., "AP_ID_001") assigned to a first end user by the privacy services system 160 and the associations between: (1) the first end user's anonymized profile identifier (i.e., "AP_ID_001"), (2) a provider's profile identifier (i.e., "NP_ID 001") assigned to the end user by a first network provider system, and (3) a provider identifier (i.e., "TELCOM_ID_1") identifying the first provider system as a network provider system (i.e., "NETWORK_PROVIDER"). Similarly, tuple 410-3 of table 410 in combination with tuple 420-5 of table 420 illustrates an anonymized profile identifier (i.e., "AP_ID_002") assigned to a second end user by the privacy services system 160 and the associations between: (1) the second end user's anonymized profile identifier (i.e., "AP_ID_002"), (2) a provider's profile identifier (i.e., "SP_ID_002") assigned to the end user by a second provider system, and (3) a provider identifier (i.e., "SERVICE_ID_1") identifying the second provider system as a services provider system (i.e., "SERVICES_PROVIDER").

In an embodiment, tuples of table 410 in combination with tuples of table 420 may also identify and define the relationships between an end user's anonymized profile identifier and its associated one or more profile consumer's profile identifiers and profile consumer identifiers. Continuing with the above examples, tuple 410-2 of table 410 in combination with tuple 420-2 of table 420 illustrates the anonymized profile identifier (i.e., "AP_ID_001") assigned to the first end user by the privacy services system 160 and the associations between the first end user's anonymized profile identifier (i.e., "AP_ID_001"), a profile consumer's profile identifier (i.e., "PC_ID_001") assigned to the end user by a first profile consumer system, and a profile consumer identifier (i.e., "SPONSOR_ID_1") identifying the first profile consumer system. Similarly and continuing with the above examples, tuple 410-4 of table 410 in combination with tuple 420-2 of table 420 illustrates the anonymized profile identifier (i.e., "AP_ID_002") assigned to the second end user by the privacy services system 160 and the associations between the second end user's anonymized profile identifier (i.e., "AP_ID_002"), a profile consumer's profile identifier (i.e., "PC_ID_002") assigned to the end user by the first profile consumer system and a profile consumer identifier (i.e., "SPONSOR_ID_1") identifying the first profile consumer system.

In an embodiment, table 430 may store the one or more token and anonymized identifier tuples when an end user creates a new user account with the privacy services system 160 and/or associate with an existing account as discussed with respect to FIGS. 3A and 3B. In an embodiment, table 440 may store the one or more token and profile identifier tuples when an end user requests affiliated content from one or more profile consumer systems 164 and the privacy services system 160 receives one or more token and profile identifier tuples from one or more profile consumer systems 164 as discussed with respect to FIG. 3C.

In an embodiment, token and anonymized identifier tuples (e.g., tuples 430-1, 430-2, 430-3, etc.) of table 430 in combination with token and profile identifier tuples (e.g., tuples 440-1, 440-2, 440-3, 440-4, etc.) of table 440 may be used by identifier management component 224 to identify one or more token and anonymized identifier tuples and one or more token and profile identifier tuples having matching unique identification tokens as discussed with respect to FIG. 3C. The combination may also enable the identifier management component 224 to identify relationships between an anonymized profile identifier assigned to an end user also discussed with respect to FIG. 3C. Additionally, as discussed with respect to FIG. 3C, and after identifying tuples with matching unique identification tokens, the identifier management component 224 may associate and store the relationships between an anonymized profile identifier assigned to an end user by the privacy services system 160, a profile consumer profile identifier assigned to the end user by a profile consumer system, and a profile consumer identifier identifying a profile consumer system as one or more tuples in table 410. An example of these tuples may include, for example, tuples 410-2, 410-4, 410-6, and 410-8 of table 410.

It may be appreciated that while the example embodiment of FIG. 4 has been discussed with specific example values, these example values are provided for purposes of illustration only and the example embodiment is not so limited in this context. Thus, the various identifiers and tokens may be represented by various combinations of alphanumeric and/or non-alphanumeric values (e.g., symbols, etc.) in various character encodings (e.g., ASCII, UTF-8, UTF-16, etc.). Furthermore, while tables are used to illustrate the anonymized profile information and the associated relationships stored within the anonymized profile identifier datastore, it may be appreciated that such implementations are for illustration purposes only. Thus, in other implementations, the same anonymized profile information and associated relationships may be stored as graph networks.

It may be further appreciated that performing the operations discussed with respect to FIGS. 3A-3C to generate the anonymized profile information as represented in the tables 410, 420, 430, and 440, the privacy services system 160 may further enhance privacy and security of the system 100 by utilizing only the respective profile identifiers to identify an end user when communicating between the various systems regarding that end user. For example, when communicating with the network provider system regarding a particular end user, the privacy services system may only reference the provider's profile identifier assigned by the network provider system to that particular end user. Similarly, when communicating with the profile consumer system regarding a particular end user, the privacy services system may only use the profile consumer profile identifier assigned by the profile consumer system to the end user. In this way, the privacy and security of the system 100 may be enhanced because neither the privacy services system nor the profile consumer systems would be able to identify any particular end user with respect to any particular end user's permitted profile information.

Figure 5:
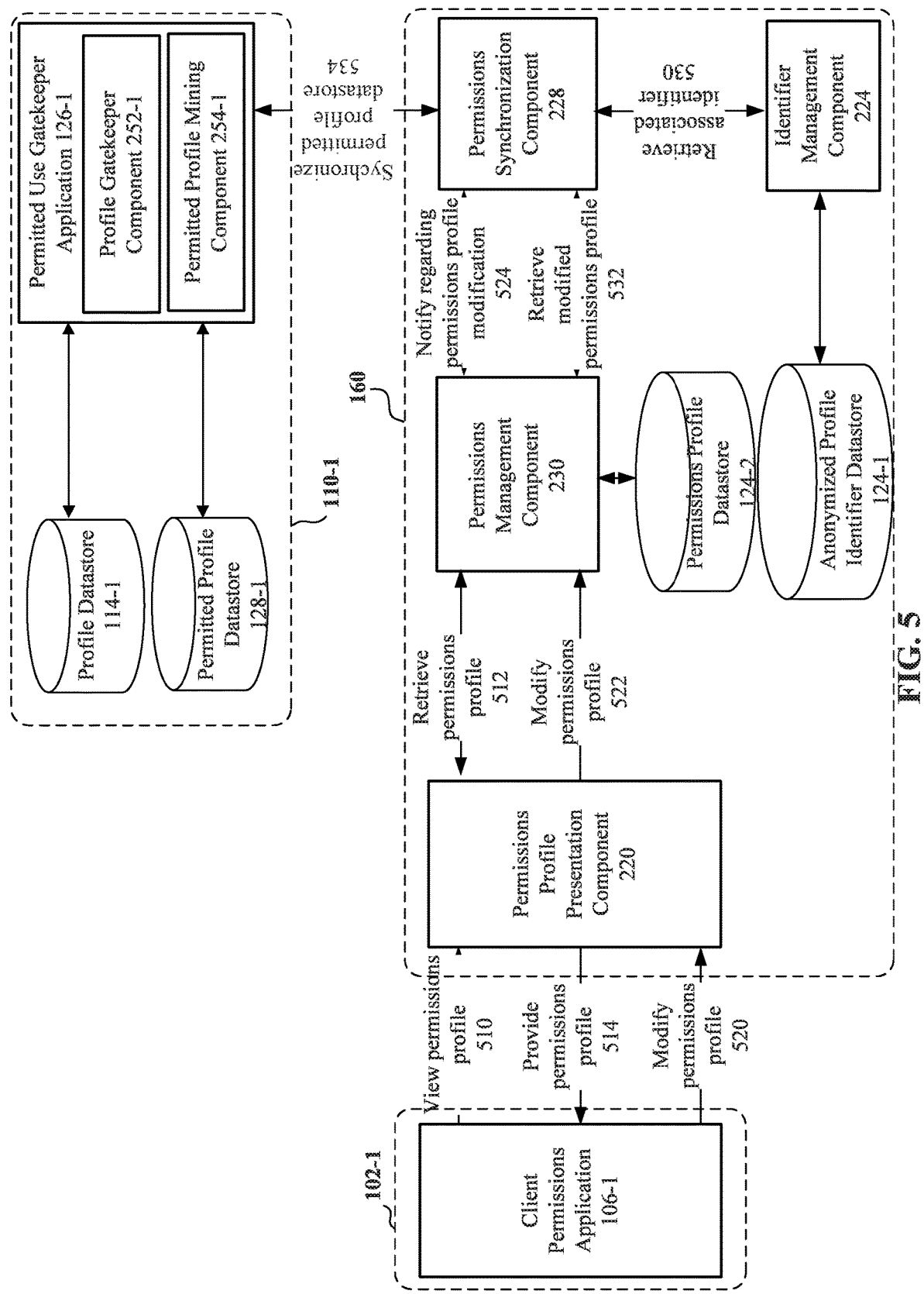
FIG. 5 illustrates processing operations that may be performed between various components to efficiently and securely filter non-permitted data according to an example embodiment.

FIG. 5 illustrates the processing operations that may be performed between various components to enable a user to control the filtering of his or her non-permitted data according to example embodiments. It is to be appreciated that not all steps may be needed to perform the disclosure provided herein. Further, some of the steps may be performed simultaneously, or in a different order than those shown in FIG. 5, as will be understood by a person of ordinary skill in the art.

In an embodiment and at step 510, the permissions profile presentation component 220 may receive a request to view a permissions profile. For example, after the end user has logged into the privacy services system 160, the permissions profile presentation component 220 may receive a request to view a permissions profile by receiving a permissions profile view request from client permissions application 106-1 to view and/or modify the end user's permissions profile.

In an embodiment and at step 512, the permissions profile presentation component 220 may retrieve a permissions profile. For example, the permissions profile presentation component 220 may retrieve the permissions profile by transmitting a permissions profile request to the permissions management component 230 to retrieve permissions profile information associated with the end user's anonymized profile identifier. The permissions profile request may include, without limitation, the anonymized profile identifier associated with the end user. In response, the permissions management component 230 may retrieve the permissions profile information stored in the permissions profile datastore 124-2 based on the end user's anonymized profile identifier and provide a permissions profile response to the permissions profile presentation component 220. The permissions profile response may include, without limitation, the permissions profile information for the end user.

In an embodiment and at step 514, the permissions profile presentation component 220 may provide the permissions profile to the client permission application 106-1. For example, the permissions profile presentation component 220 may provide the permissions profile information to the end user by transmitting a permissions profile view response, where the permissions profile view response includes one or more UI views (e.g., UI views illustrated in FIGS. 6A-6B, 7A-7B, 8) configured to visually present the retrieved permissions profile information for an end user.

In an embodiment and at step 520, the permissions profile presentation component 220 may receive a request to modify the permissions profile. For example, the permissions profile presentation component 220 may receive a request to modify permissions profile from the client permissions application 106-1 by receiving a permissions profile view modification request, the request including at least one permissions attribute and associated permissions attribute value the end user has modified (e.g., modified from enabled to disabled or disabled to enabled, etc.) in the one or more UI views (e.g., UI views illustrated in FIGS. 6A-6B, 7A-7B, 8).

In an embodiment and at step 522, the permissions profile presentation component 220 may request to modify permissions profile. For example, permissions profile presentation component 220 may request to modify the permissions profile by transmitting a permissions profile modification request to the permissions management component 230, where the permissions profile modification request may include the anonymized profile identifier associated with the end user and the at least one attribute and associated permissions attribute value the end user has modified. In response, the permissions management component 230 may modify the at least one attribute and associated permissions attribute value stored in the permissions profile datastore 124-1 and associated with the anonymized profile identifier.

In an embodiment and at step 524, the permissions management component 230 may optionally notify regarding permissions profile modification. For example, the permissions management component 230 may notify regarding a permissions profile modification by transmitting a permission profile modification notification to the permissions synchronization component 228 to notify the permissions synchronization component 228 that the permissions profile information for the end user has been modified. The permissions profile modification notification may include, without limitation, the anonymized profile identifier of the end user that modified his/her permissions profile information. In response, the permissions synchronization component 228 may store the permissions profile modification notification in a permissions modification queue which may be stored in a permissions modification datastore (not shown).

In an embodiment and at step 530, the permissions synchronization component 228 may retrieve associated identifiers. For example, the permissions synchronization component 228 may retrieve associated identifiers by transmitting a provider's profile identifier request to the identifier management component 224. The provider's profile identifier request may include one or more anonymized profile identifiers in the one or more received permissions profile modification notifications. In response, the identifier management component 224 may translate or convert each anonymized profile identifier to one or more pairs of provider's profile identifier and provider identifier utilizing the anonymized profile identifier datastore 124-1 (e.g., table 410 stored in the anonymized profile identifier datastore 124-1 as illustrated in FIG. 4). The identifier management component 224 may further transmit a provider's profile identifier response to the permissions synchronization component 228, where the provider's profile identifier response includes one or more pairs of provider's profile identifier and provider identifier.

In an embodiment and at step 532, the permissions synchronization component 228 may retrieve a modified permissions profile. For example, the permissions synchronization component 228 may retrieve a modified permissions profile by transmitting a modified permissions profile request to the permissions management component 230. The modified permissions profile request may include the one or more anonymized profile identifiers received in the one or more permissions profile modification notifications. In response, the permissions management component 230 may transmit the one or more pairs of anonymized profile identifier and associated permissions profile information (e.g., one or more permissions attribute and associated permissions attribute values) for each anonymized profile identifier.

In an embodiment and at step 534, the permissions synchronization component 228 may synchronize a permitted profile datastore. For example, the permissions synchronization component 228 may synchronize a permitted profile datastore residing in the network provider system 110-1 by: (1) identifying one or more pairs of provider's profile identifier and permissions profile information based on the one or more pairs of provider's profile identifier and provider identifier (discussed with respect to step 530) and the one or more pairs of anonymized profile identifier and associated permissions profile information (discussed with respect to step 532); and (2) transmitting a permitted profile synchronization request to the network provider system 110-1 (or a services provider system) as identified by a provider identifier associated with each pair of the one or more pairs of provider's profile identifier and permissions profile information. The synchronization request may include, without limitation, the previously identified one or more pairs of provider's profile identifier and permissions profile information.

While not explicitly illustrated, it may be appreciated that steps 530, 532, and 534 may be performed by the permissions synchronization component 228 in response to receiving a set number (e.g., ten (10), twenty (20), one hundred (100), etc.) of one or more permissions profile modification notifications. Additionally or alternatively, steps 530, 532, and 534 may also be performed on a periodic basis by the permissions synchronization component 228 (e.g., every hour, every four (4) hours, every twelve (12) hours, etc.).

Additionally or alternatively, the permissions synchronization component 228 may be further configured to: (1) retrieve access duration information associated with end users 108 on a periodic basis (every twelve (12) hours, every twenty four (24) hours, etc.) from the permissions profile datastore 124-2; (2) determine whether the permitted profile information for each end user stored in the relevant permitted profile datastore should remain stored in the permissions profile datastore 124-2 or otherwise accessible, based on the retrieved access duration information and the current date and time information (e.g., the current date and time in Eastern Standard Time, etc.); and (3) perform steps 530, 532, and 534 when the permissions synchronization component 228 determines that the permitted profile information should no longer be stored or otherwise accessible.

In an embodiment and in response to receiving the synchronization request of the permitted profile datastore at step 534, the profile gatekeeper component 252-1 may: (1) receive the permitted profile synchronization request from the permissions synchronization component 228 to synchronize the provider's profile information in accordance with permissions profile information of the end user; (2) filter provider's profile information stored in profile datastore 114-1 for the end user identified by the provider's profile identifier based on corresponding permissions profile information; (3) generate permitted profile information for the end user identified by provider's profile identifier based on the filtering; and (4) store the permitted profile information in the permitted profile datastore 128-1 managed by the network provider system 110-1, wherein the permitted profile datastore 128-1 is configured to store the permitted profile information for the end user identified by the provider's profile identifier in a domain specific ontology that is common or shared between multiple network provider systems 110 and services provider systems 170. Additionally, the profile gatekeeper component 252-1 may also remove previously stored permitted profile information in the permitted profile datastore 128-1 based on permissions profile information, including the access duration information, for an end user identified by the provider's profile identifier.

Additionally, while not explicitly illustrated, the profile gatekeeper component 252-1 may also be configured to maintain a separate cached permission profile datastore (not shown). The profile gatekeeper component 252-1 may store or cache the received permissions profile information and associated provider's profile identifier transmitted in the synchronization request.

It may be appreciated that while the example embodiment of FIG. 5 has been discussed with respect to network provider system 110-1, the example embodiment is not so limited in this context. For example, the operations of the example embodiment of FIG. 5 may be repeated for one or more network provider systems 110 (e.g., network provider system 110-2, 110-3, etc.) as long as the end user has associated user profile information stored with a particular network provider system (e.g., network provider system 110-2) and that user profile information is associated with his or her anonymized profile identifier within privacy services system 160. In another example, the operations of the example embodiment of FIG. 5 may also be repeated with respect to any particular one of the one or more services provider systems 170 (e.g., a services provider system 170-1, 170-2, etc.) as long as the end user has user profile information stored with a particular services provider system (e.g., services provider system 170-1) that is associated with his or her anonymized profile identifier within privacy services system 160. In yet a further example, the operations of the example embodiment of FIG. 5 may be further repeated with respect to any combination of one or more network provider systems 110 (e.g., a network provider systems 110-1, 110-2, etc.) and/or one or more services provider systems 170 (e.g., a services provider system 170-1, 170-2, etc.).

FIGS. 6A and 6B illustrate one or more UI views that modify permissions profile information according to example embodiments. In an example embodiment, FIG. 6A illustrates a permissions categories UI view that may be provided by the permissions profile presentation component 220 to the client permissions applications (e.g., client permissions application 106-1, 106-2, 106-3, etc.) for display on user devices 104. As illustrated in FIG. 6A, the permissions categories UI view may visually present one or more permissions categories (e.g., "Characteristic data," "Sensitive Personal Data," "Customer Proprietary Network Information," etc.) of an end user's permissions profile information. Additionally each permissions category may include a selectable UI element (e.g., selectable UI element 610-1, 610-2, 610-3) associated with each permissions category. The selectable UI element may allow the end user to either enable all permissions profile information in that permissions category to be accessible (e.g., "Allow all") by the profile consumer systems 164 or to individually customize permissions attributes (e.g., "Customize") in a permissions category as further discussed in FIG. 6B.

FIG. 6B illustrates an example embodiment of a permissions category UI view that may be provided by the permissions profile presentation component 220 to the client permissions applications (e.g., client permissions application 106-1, 106-2, 106-3, etc.) for display on user devices 104 after the end user selects to customize permissions attributes in a permissions category. As illustrated in FIG. 6B, the permissions category UI view may visually present one or more permissions attribute UI elements (e.g., permissions attribute UI element 620-1, 620-2, 620-3, 620-4, 620-5, 620-6, 620-7, 620-8, and 620-9) in the selected permissions category (e.g., "Characteristic Data") for further customization. Each permissions attribute UI element may include, without limitation, the name of the permissions attribute (e.g., "Date of Birth," "Gender," "Ethnicity," etc.) and associated permissions attribute value. The permissions attribute value may indicate whether the permission attribute allows (e.g., a checked box next to "Allow") or does not allow (e.g., an empty check box next to "Allow") access by the profile consumer systems 164, which may be modified by the end user. It may be appreciated that in the context of certain prevalent consumer privacy regulatory regimes, a checked box next to "Allow" may constitute an end user's requisite express (i.e., "opt-in") consent authorizing one or more of the network provider systems (e.g., mobile telecommunications carriers, etc.) to allow access or otherwise take an action with respect to a profile attribute and profile attribute value pair from that end user's user profile information corresponding to the permissions attribute and permissions attribute value pair.

Optionally, each permissions attribute UI element may also visually present the underlying profile attribute value (e.g., "Jan. 1, 1955") associated with that permissions attribute (e.g., "Date of Birth"). To ensure that the privacy services system 160 does not access any end user's user profile information, the permissions profile presentation component 220 may be configured to provide profile attribute references to the client permissions application, so that the client permissions application may request and retrieve one or more profile attribute values from the respective network provider system and/or services provider system. The retrieved profile attribute values may then be visually presented in the respective permissions attribute UI element as illustrated in FIG. 6B. It may be appreciated that in the context of certain prevalent consumer privacy regulatory regimes, a network systems provider may be required to allow an end user to view and edit his or her profile attribute values and in this example embodiment of FIG. 6B, that requirement may be satisfied without the privacy services system 160 (or other network provider systems) accessing the end user's associated profile attribute value.

FIGS. 7A and 7B illustrate one or more UI views to modify access recipients information according to an example embodiment. As illustrated in FIG. 7A, the recipients categories UI view may visually present one or more recipients categories (e.g., "Mobile Ad Networks," "Social Media," "Data Brokers," etc.). Each recipient categories may define one or more recipients or profile consumer systems that may access an end user's user profile information with respect to which an end user may choose to allow or not allow that access as defined by the end user's access recipients information. Additionally, each recipients category may include a selectable UI element (e.g., selectable UI element 710-1, 710-2, 710-3) associated with each recipients category. The selectable UI element may allow the end user to either enable all recipients in a recipients category to access the end user's user profile information (e.g., "Allow all") or to individually customize individual recipients (e.g., "Customize") in each recipients category as further discussed in FIG. 7B. It may be appreciated that in the context of certain prevalent consumer privacy regulatory regimes, an end user must express his or her opt-in consent in order to permit a network provider system to share profile attributes and associated profile attribute values of the end user's user profile information with one or more profile consumer systems as identified in a recipients category.

FIG. 7B illustrates an example embodiment of a receipts category UI view that may be provided by the permissions profile presentation component 220 to the client permissions applications (e.g., client permissions application 106-1, 106-2, 106-3, etc.) for display on user devices 104 after the end user selects to customize individual recipients in a recipients category. As illustrated in FIG. 7B, the recipients category UI view may visually present one or more recipient UI elements (e.g., recipient UI element 720-1, 720-2, 720-3, 720-4, 720-5, 720-6) in the selected recipient category (e.g., "Mobile Ad Networks") for further customization. Each receipt UI element may include, without limitation, a recipient attribute (e.g., "Admob," "Open Mediaworks," "Unity Ads," "Chartboost," "Applovin," "MobileCore," etc.), which may identify the name associated with a profile consumer system, and associated recipient attribute value. The recipient attribute value may indicate whether a recipient identified by the receipt attribute (e.g., "Admob,") is allowed (e.g., a checked box next to "Allow") or is not allowed (e.g., an empty check box next to "Allow") to utilize the end user's user profile information, which may be modified by the end user.

Figure 8:
FIG. 8 illustrates a UI view to modify access purpose information according to an example embodiment.

FIG. 8 illustrates an access purpose UI view to modify access purpose information according to an example embodiment. As illustrated in FIG. 6B, the access purpose UI view may visually present one or more access purpose UI elements (e.g., access purpose UI element 810-1, 810-2, 810-3, 810-4, 810-5, 810-6, 810-7, and 810-8) for further customization. Each access purpose UI element may include, without limitation, the purpose attribute (e.g., receive marketing information from "Search Engines," "Banner Ads," "Video Ads," etc.) and associated purpose attribute value. The purpose attribute value may indicate whether the end user (e.g., "Search Engine") allows (e.g., a checked box next to "Allow") or does not allow (e.g., an empty check box next to "Allow") the particular access purpose as defined by the purpose attribute of use by a profile consumer system, which may be modified by the end user. It may be appreciated that in the context of certain prevalent consumer privacy regulatory regimes, an end user must express his or her opt-in consent in order to permit a network systems provider to take an action related to a particular access purpose.

Figure 9:
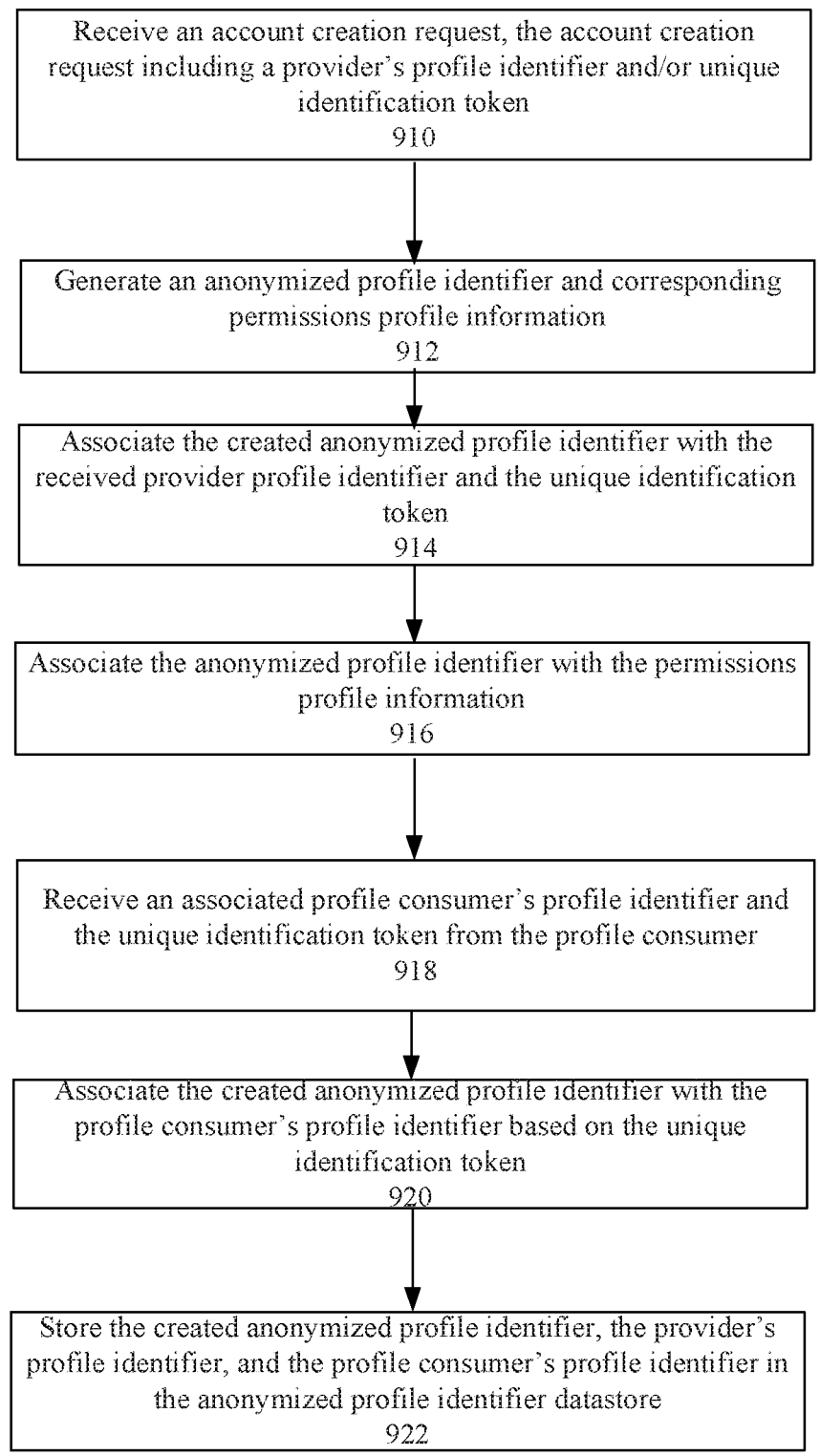
FIG. 9 illustrates processing operations to enable a user to control the filtering of his or her non-permitted data according to another example embodiment.

FIG. 9 illustrates processing operations to enable a user to control the filtering of his or her non-permitted data according to another example embodiment. It is to be appreciated that not all steps may be needed to perform the disclosure provided herein. Further, some of the steps may be performed simultaneously, or in a different order than those shown in FIG. 9, as will be understood by a person of ordinary skill in the art.

Continuing with the example embodiment at step 910, the privacy services system may receive an account creation request, the account creation request including a provider's profile identifier and/or a unique identification token. For example, privacy services system (e.g., the permissions profile presentation component 220, etc.) may receive an account creation request, the account creation request including a provider's profile identifier and/or unique identification token for a user of the user device. Additionally or alternatively, instead of receiving the unique identification token for a user of the user device in the account creation request, privacy services system (e.g., permissions profile presentation component 220, etc.) may generate the unique identification token and transmit the unique identification token to the user device to be cached by the user device.

Continuing with the example embodiment at step 912, the privacy services system may generate an anonymized profile identifier and corresponding permissions profile information. For example, the privacy services system (e.g., account creation component 226, permissions management component 230, and/or account management component 232, etc.) may generate an anonymized profile identifier and corresponding permissions profile information, in response to the received permissions profile creation request.

Continuing with the example embodiment at step 914, the privacy services system may associate the created anonymized profile identifier with the provider profile identifier and a unique identification. For example, the privacy services system (e.g., account creation component 226 and/or identifier management component 224, etc.) may associate the created anonymized profile identifier with the provider profile identifier and the unique identification token that may be associated with the user device and/or the end user of the user device.

Continuing with the example embodiment at step 916, the privacy services system may associate the anonymized profile identifier with the permissions profile information. For example, the privacy services system (e.g., account creation component 226, permissions management component 230, and/or account management component 232, etc.) may associate the anonymized profile identifier with the permissions profile information.

Continuing with the example embodiment at step 918, the privacy services system may receive an associated profile consumer's profile identifier and the unique identification token from the profile consumer. For example, the privacy services system (e.g., identifier management component 224, etc.) may receive a profile consumer's profile identifier and the unique identification token associated with the profile consumer's profile identifier from the profile consumer.

Continuing with the example embodiment at step 920, the privacy services system may associate the created anonymized profile identifier with the profile consumer's profile identifier based on the unique identification token. For example, the privacy services system (e.g., identifier management component 224, etc.) may receive a profile consumer's profile identifier and the unique identification token associated with the profile consumer's profile identifier from the profile consumer based on the same unique identification token received from the profile consumer.

Continuing with the example embodiment at step 922, the privacy services system may store the created anonymized profile identifier, the provider's profile identifier, and the profile consumer's profile identifier in the anonymized profile identifier datastore. For example, the privacy services system (e.g., identifier management component 224, etc.) may store the created anonymized profile identifier, the provider's profile identifier, and the profile consumer's profile identifier in the anonymized profile identifier datastore (e.g., anonymized profile identifier datastore 124-1).

Figure 10:
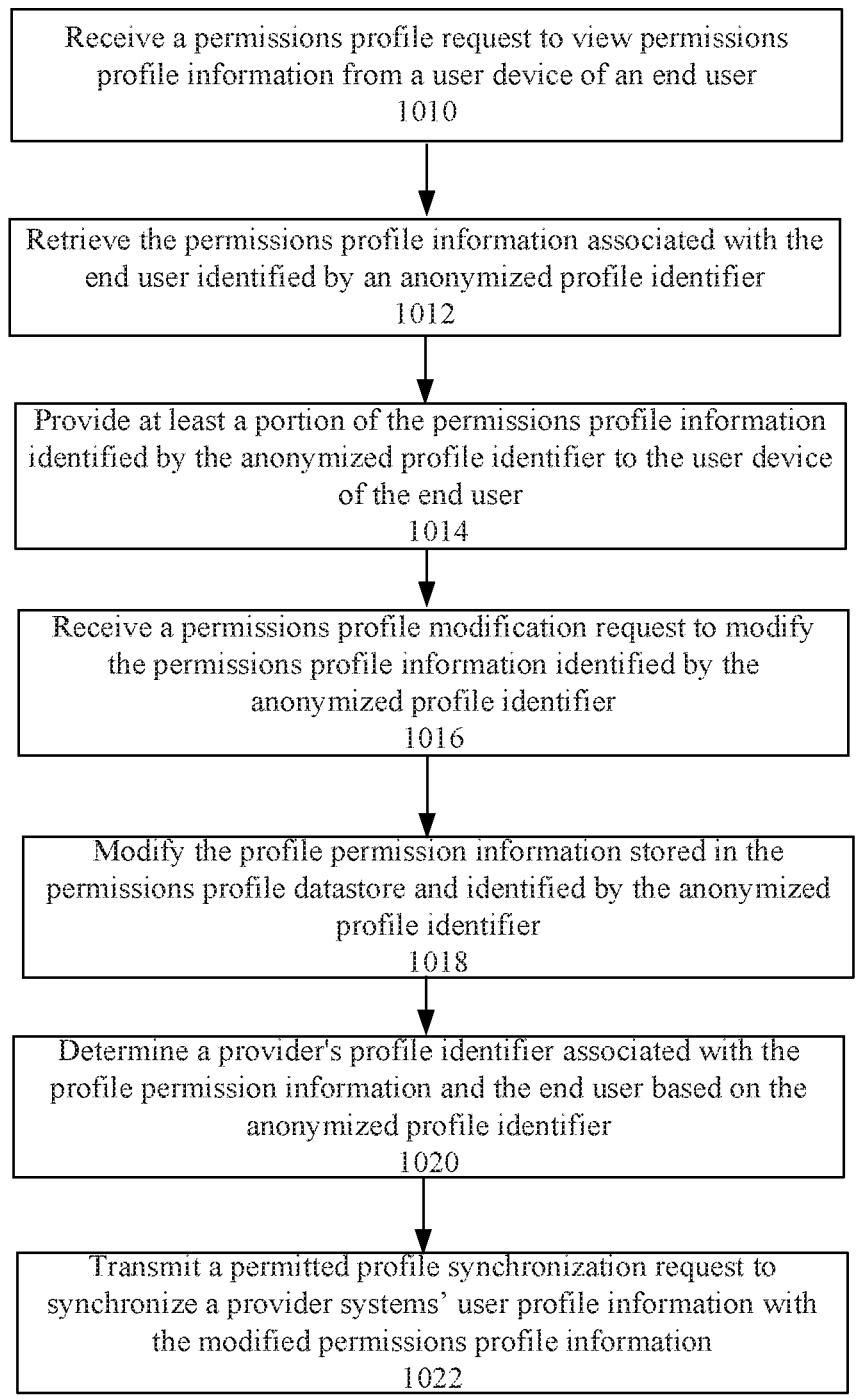
FIG. 10 illustrates processing operations to initiate the efficient and secure filtering of non-permitted data according to another example embodiment.

FIG. 10 illustrates processing operations to synchronize an end user's permissions profile with provider systems' user profile datastore according to another example embodiment. It is to be appreciated that not all steps may be needed to perform the disclosure provided herein. Further, some of the steps may be performed simultaneously, or in a different order than those shown in FIG. 10, as will be understood by a person of ordinary skill in the art.

Continuing with the example embodiment at step 1010, the privacy services system may receive a permissions profile request to view permissions profile information from a user device of an end user. For example, the privacy services system (e.g., the permissions profile presentation component 220, etc.) may receive a permissions profile request to view permissions profile information from a user device of an end user, the request may optionally identify the end user by an anonymized profile identifier associated with the end user.

Continuing with the example embodiment at step 1012, the privacy services system may retrieve the permissions profile information associated with the end user identified by an anonymized profile identifier. For example, the privacy services system (e.g., the permissions profile presentation component 220 and/or permissions management component 230, etc.) may retrieve the permissions profile information associated with the end user identified by an anonymized profile identifier from a permissions profile datastore (e.g., permissions profile datastore 124-2).

Continuing with the example embodiment at step 1014, the privacy services system may provide at least a portion of the permissions profile information identified by the anonymized profile identifier to the user device of the end user. For example, the privacy services system (e.g., the permissions profile presentation component 220, etc.) may provide at least a portion of the permissions profile information identified by the anonymized profile identifier to the user device of the end user in one or more UI views as illustrated in FIGS. 6A-6B, 7A-7B, 8.

Continuing with the example embodiment at step 1016, the privacy services system may receive a permissions profile modification request to modify the permissions profile information identified by the anonymized profile identifier. For example, the privacy services system (e.g., the permissions profile presentation component 220 and/or permissions management component 230, etc.) may receive a permissions profile modification request to modify the permissions profile information identified by the anonymized profile identifier from the end user's user device, where permissions profile modification request includes at least one permissions profile the end user has modified.

Continuing with the example embodiment at step 1018, the privacy services system may modify the profile permission information stored in the permissions profile datastore and identified by the anonymized profile identifier. For example, the privacy services system (e.g., the permissions management component 230, etc.) may modify the profile permission information stored in the permissions profile datastore and identified by the anonymized profile identifier, in response to the permissions profile modification request.

Continuing with the example embodiment at step 1020, the privacy services system may determine a provider's profile identifier associated with the profile permission information and the end user based on the anonymized profile identifier. For example, privacy services system (e.g., the identifier management component 224, etc.) may determine a provider's profile identifier associated with the profile permission information and the end user based on the anonymized profile identifier.

Continuing with the example embodiment at step 1022, the privacy services system may transmit a permitted profile synchronization request to synchronize the provider's user profile information with the modified permissions profile information. For example, privacy services system (e.g., the permissions synchronization component 228, etc.) may transmit a permitted profile synchronization request to a permitted use gatekeeper application (e.g., permitted use gatekeeper application 126-1 of a provider system) to synchronize the provider system's user profile information with the modified permissions profile information.

Figure 11:
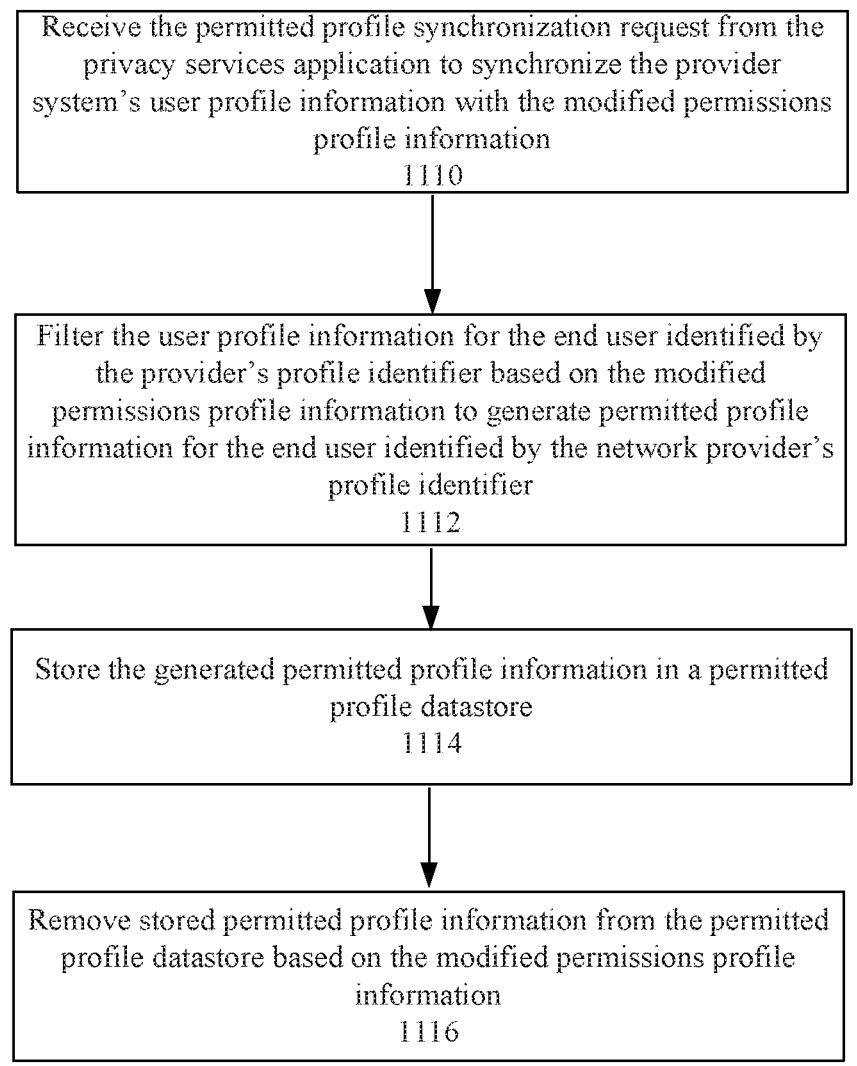
FIG. 11 illustrates processing operations to efficiently and securely filter non-permitted data according to another example embodiment.

FIG. 11 illustrates processing operations to efficiently and securely filter non-permitted data according to another example embodiment. It is to be appreciated that not all steps may be needed to perform the disclosure provided herein. Further, some of the steps may be performed simultaneously, or in a different order than those shown in FIG. 11, as will be understood by a person of ordinary skill in the art.

Continuing with the example embodiment at step 1110, the permitted use gatekeeper application may receive the permitted profile synchronization request from the privacy services application to synchronize the user profile information with the permissions profile information. For example, the permitted use gatekeeper application (e.g, permitted use gatekeeper application 126-1, 126-2, 126-3 . . . 126-g) may receive the permitted profile synchronization request from the privacy services application to synchronize the user profile information with the permissions profile information.

Continuing with the example embodiment at step 1112, the permitted use gatekeeper application may filter the user profile information identified by the provider's profile identifier based on the permissions profile information to generate the permitted profile information. For example, the permitted use gatekeeper application (permitted use gatekeeper application 126-1, 126-2, 126-3 . . . 126-g) may filter user profile information for the end user identified by the provider's profile identifier based on the modified permissions profile information to generate permitted profile information for the end user identified by network provider's profile identifier.

Continuing with the example embodiment at step 1114, the permitted use gatekeeper application may store the permitted profile information in a permitted profile datastore. For example, the permitted use gatekeeper application (permitted use gatekeeper application 126-1, 126-2, 126-3 . . . 126-g) may store the permitted profile information in a permitted profile datastore hosted by server devices of the provider system, wherein the permitted profile datastore is configured to store the permitted profile information for the user identified by the provider's profile identifier.

Continuing with the example embodiment at step 1116, the permitted use gatekeeper application may remove stored permitted profile information from the permitted profile datastore based on the modified permissions profile information. For example, the permitted use gatekeeper application (permitted use gatekeeper application 126-1, 126-2, 126-3 . . . 126-g) may remove one or more stored profile attributes and associated profile attribute values from end users' permitted profile information in the permitted profile datastore based on the modified permissions profile information.

EXAMPLE COMPUTER SYSTEM

Figure 12:
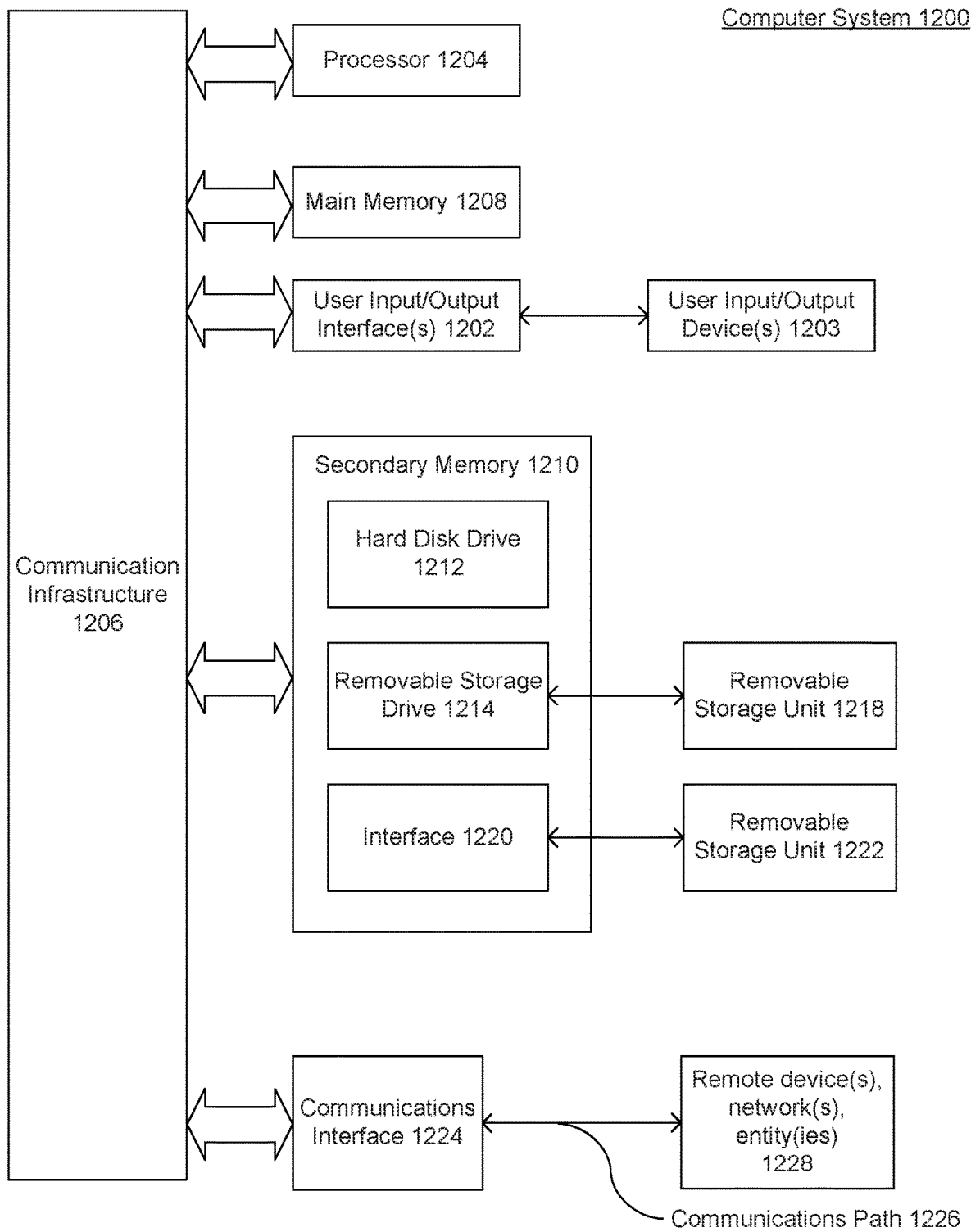
FIG. 12 illustrate an example embodiment that may be useful in implementing various components of efficient and secure data filtering of non-permitted data.

Various embodiments and components therein can be implemented, for example, using one or more well-known computer systems, such as, for example, user devices 104, network provider server devices 116, services provider server devices 172, privacy services server devices 120, content provider server devices 130, and profile consumer server devices 140. Computer system 1200, as shown in FIG. 12, can be any well-known computer capable of performing the functions described herein.

Computer system 1200 includes one or more processors (also called central processing units, or CPUs), such as a processor 1204. Processor 1204 is connected to a communication infrastructure or bus 1206.

One or more processors 1204 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1200 also includes user input/output device(s) 1203, such as monitors, keyboards, pointing devices, etc., that communicate with communication infrastructure 1206 through user input/output interface(s) 1202.

Computer system 1200 also includes a main or primary memory 1208, such as random access memory (RAM). Main memory 1208 may include one or more levels of cache. Main memory 1208 has stored therein control logic (i.e., computer software) and/or data.

Computer system 1200 may also include one or more secondary storage devices or memory 1210. Secondary memory 1210 may include, for example, a hard disk drive 1212 and/or a removable storage device or drive 1214. Removable storage drive 1214 may be a floppy disk drive, a magnetic tape drive, a compact disk drive, an optical storage device, tape backup device, and/or any other storage device/drive.

Removable storage drive 1214 may interact with a removable storage unit 1218. Removable storage unit 1218 includes a computer usable or readable storage device having stored thereon computer software (control logic) and/or data. Removable storage unit 1218 may be a floppy disk, magnetic tape, compact disk, DVD, optical storage disk, and/any other computer data storage device. Removable storage drive 1214 reads from and/or writes to removable storage unit 1218 in a well-known manner.

According to an exemplary embodiment, secondary memory 1212 may include other means, instrumentalities or other approaches for allowing computer programs and/or other instructions and/or data to be accessed by computer system 1200. Such means, instrumentalities or other approaches may include, for example, a removable storage unit 1222 and an interface 1220. Examples of the removable storage unit 1222 and the interface 1220 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1200 may further include a communication or network interface 1224. Communication interface 1224 enables computer system 1200 to communicate and interact with any combination of remote devices, remote networks, remote entities, etc. (individually and collectively referenced by reference number 1228). For example, communication interface 1224 may allow computer system 1200 to communicate with remote devices 1228 over communication path 1226, which may be wired and/or wireless, and which may include any combination of LANs, WANs, the Internet, etc. Control logic and/or data may be transmitted to and from computer system 1200 via communication path 1226.

In an embodiment, a tangible apparatus or article of manufacture comprising a tangible computer useable or readable medium having control logic (software) stored thereon is also referred to herein as a computer program product or program storage device. This includes, but is not limited to, computer system 1200, main memory 1208, secondary memory 1212, and removable storage units 1218 and 1222, as well as tangible articles of manufacture embodying any combination of the foregoing. Such control logic, when executed by one or more data processing devices (such as computer system 1200), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 12. In particular, embodiments may operate with software, hardware, and/or operating system implementations other than those described herein.

CONCLUSION

It is to be appreciated that the Detailed Description section, and not the Summary and Abstract sections, is intended to be used to interpret the claims. The Summary and Abstract sections may set forth one or more but not all exemplary embodiments of the invention as contemplated by the inventors, and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

The breadth and scope of the invention should not be limited by any of the above-described exemplary embodiments, but should be defined only in accordance with the following claims and their equivalents.

What is claimed is:

1. A system, comprising:
an anonymized profile identifier datastore configured to store at least one anonymized profile identifier, provider's profile identifier, and profile consumer's profile identifier;
a permissions profile datastore configured to store permissions profile information for at least one user identified by the at least one anonymized profile identifier;
a permitted use gatekeeper application configured to generate permitted profile information for a user identified by a provider's profile identifier based on user profile information and the permissions profile information of the user; and
a server device configured to execute a privacy services application, wherein the privacy services application is operatively coupled to the permitted use gatekeeper application, a profile consumer system, the anonymized profile identifier datastore, and the permissions profile datastore, and the privacy services application is configured to
receive an account creation request, the account creation request including a provider's profile identifier that identifies a user profile for the user of a user device,
generate an anonymized profile identifier and corresponding permissions profile information, in response to the received account creation request,
associate the anonymized profile identifier with the provider's profile identifier and a unique identification token,
associate the anonymized profile identifier with the permissions profile information,
receive the unique identification token and an associated profile consumer's profile identifier from the profile consumer system,
associate the anonymized profile identifier with the profile consumer's profile identifier based on the unique identification token associated with the user device,
store the anonymized profile identifier, the provider's profile identifier, and the profile consumer's profile identifier in the anonymized profile identifier datastore,
modify the permissions profile information associated with the user identified by the anonymized profile identifier, in response to receiving at least one modification to a permissions attribute of the user's permissions profile information, and
synchronize the permitted profile information of the user stored in a permitted profile datastore based on the modification to the permissions attribute of the user's permissions profile information.

2. The system of claim 1, wherein:
the provider's profile identifier is associated with a provider identifier that identifies a provider system, and
the profile consumer's profile identifier is associated with a profile consumer identifier that identifies the profile consumer system.

3. The system of claim 1, wherein:
the provider's profile identifier is a unique identifier assigned by a provider system identified by a provider identifier assigned by the privacy services application, and
the profile consumer's profile identifier is a unique identifier assigned by the profile consumer system identified by a profile consumer identifier assigned by the privacy services application.

4. The system of claim 1, wherein the privacy services application is further configured to:
provide at least a portion of the permissions profile information identified by the anonymized profile identifier to the user device to visually present at least one permissions profile on the user device for modification, and
notify a permissions synchronization component regarding a modification to the at least one permissions attribute of the permissions profile information.

5. The system of claim 1, wherein the privacy services application is further configured to:
determine the provider's profile identifier based on the anonymized profile identifier associated with the permissions profile information, and
transmit a permitted profile synchronization request to synchronize the user profile information based on the permissions profile information, wherein the permitted profile synchronization request includes the provider's profile identifier for the user of a provider system and the permissions profile information of the user.

6. The system of claim 5, wherein the permitted use gatekeeper application is further configured to:
receive the permitted profile synchronization request from the privacy services application to synchronize the user profile information with the permissions profile information for the user of the provider system;
filter the user profile information identified by the provider's profile identifier based on the permissions profile information to generate the permitted profile information for the user identified by the provider's profile identifier;
store the permitted profile information in the permitted profile datastore managed by the provider system, wherein the permitted profile datastore is configured to store the permitted profile information for the user identified by the provider's profile identifier; and
remove stored permitted profile information from the permitted profile datastore based on the modified permissions profile information.

7. The system of claim 5, wherein the privacy services application is further configured to:
receive the account creation request from the user device utilizing an encrypted communications protocol, and
transmit the permitted profile synchronization request to the permitted use gatekeeper application utilizing the encrypted communications protocol.

8. The system of claim 1, wherein:
the privacy services application is operatively coupled to at least one provider system, and the at least one provider system includes a network provider system and/or a services provider system; and
the privacy services application is operatively coupled to at least one profile consumer system, and the at least one profile consumer system includes a social networking system, a consumer insights system, a data broker system, and/or a marketer system.

9. The system of claim 1, wherein:
the permissions profile information includes at least one permissions attribute and corresponding permissions attributes value,
the user profile information includes at least one profile attribute and corresponding profile attribute value, and
the at least one permissions attribute value indicates whether to allow or not allow access to the at least one profile attribute corresponding to the at least one permissions attribute.

43

10. The system of claim 1, wherein:
the permissions profile information includes access purpose information, access recipients information, and access duration information,
the access purpose information defines at least one purpose for which the profile consumer system is allowed to use the permitted profile information,
the access recipients information defines at least one profile consumer system that is allowed to access the permitted profile information, and
the access duration information defines an amount of time or a number of times the permitted profile information associated with the user is accessible.

11. The system of claim 2, wherein:
the privacy services application is configured to synchronize the permitted profile information of the user based on at least one service level objective of the provider system, and
the at least one service level objective includes at least one time period to access a user profile datastore, a maximum frequency of access during the at least one time period of access, and a maximum data throughput during the at least one time period of access.

12. The system of claim 2, wherein the provider system includes at least one services provider server device configured to host or execute a user profile datastore, the permitted profile datastore, and the permitted use gatekeeper application operatively coupled to the user profile datastore and the permitted profile datastore.

13. A computer implemented method, comprising:
receiving, by at least one component of a privacy services application, an account creation request from a user device, the account creation request including a provider's profile identifier that identifies a user profile for a user of the user device;
generating, by the at least one component of the privacy services application, an anonymized profile identifier and corresponding permissions profile information, in response to the received account creation request;
associating, by the at least one component of the privacy services application, the anonymized profile identifier with the received provider's profile identifier and a unique identification token;
associating, by the at least one component of the privacy services application, the anonymized profile identifier with the permissions profile information;
receiving, by the at least one component of the privacy services application, the unique identification token and an associated profile consumer's profile identifier from a profile consumer system;
associating, by the at least one component of the privacy services application, the anonymized profile identifier with the profile consumer's profile identifier based on the unique identification token associated with the user device;
storing, by the at least one component of a privacy services application, the created anonymized profile identifier, the provider's profile identifier, and the profile consumer's profile identifier in the anonymized profile identifier datastore;
receiving, by the at least one component of the privacy services application, a permissions profile modification request from the user device of the user to modify permissions profile information identified by the anonymized profile identifier;
modifying, by the least one component of the privacy services application, the permissions profile information associated with the user identified by the anonymized profile identifier, in response to receiving the permissions profile modification request to modify at least one permissions attribute of the user's permissions profile information; and
synchronizing, by the least one component of the privacy services application, permitted profile information of the user stored in a permitted profile datastore based on the modification to the permissions attribute of the user's permissions profile information.

14. The computer implemented method of claim 13, wherein:
the provider's profile identifier is associated with a provider identifier that identifies a provider system, and
the profile consumer's profile identifier is associated with a profile consumer identifier that identifies the profile consumer system.

15. The computer implemented method of claim 13, wherein:
the provider's profile identifier is a unique identifier assigned by a provider system,
the provider system is identified by a provider identifier assigned by the privacy services application, and
the profile consumer's profile identifier is a unique identifier assigned by the profile consumer system identified by a profile consumer identifier assigned by the privacy services application.

16. The computer implemented method of claim 13, further comprising:
providing, by the at least one component of the privacy services application, at least a portion of the permissions profile information identified by the anonymized profile identifier to the user device to visually present at least one permissions profile on the user device for modification; and
notifying, by the at least one component of the privacy services application, a permissions synchronization component regarding a modification to the at least one permissions attribute of the permissions profile information.

17. The computer implemented method of claim 16, further comprising:
determining, by the at least one component of the privacy services application, the provider's profile identifier based on the anonymized profile identifier associated with the permissions profile information, and
transmitting, by the at least one component of the privacy services application, a permitted profile synchronization request to a permitted use gatekeeper application to synchronize the user profile information based on the permissions profile information, wherein the permitted profile synchronization request includes the provider's profile identifier for the user of a provider system and the permissions profile information of the user.

18. The computer implemented method of claim 17, wherein the permitted use gatekeeper application is configured to:
receive the permitted profile synchronization request from the privacy services application to synchronize the user profile information with the permissions profile information for the user of the provider system;
filter the user profile information identified by the provider's profile identifier based on the permissions profile information to generate the permitted profile information for the user identified by the provider's profile identifier;

store the permitted profile information in the permitted profile datastore managed by the provider system, wherein the permitted profile datastore is configured to store the permitted profile information for the user identified by the provider's profile identifier; and remove stored permitted profile information from the permitted profile datastore based on the modified permissions profile information.

19. A tangible computer-readable device having instructions stored thereon that, when executed by at least one computing device, causes the at least one computing device to perform operations comprising:

receiving an account creation request from a user device, the account creation request including a provider's profile identifier that identifies a user profile for a user of the user device;

generating an anonymized profile identifier and corresponding permissions profile information, in response to the received account creation request;

associating the anonymized profile identifier with the received provider's profile identifier and a unique identification token associated with the user device;

associating the anonymized profile identifier with the permissions profile information;

receiving the unique identification token and an associated profile consumer's profile identifier from a profile consumer system;

associating the anonymized profile identifier with the profile consumer's profile identifier based on the unique identification token associated with the user device;

storing the anonymized profile identifier, the provider's profile identifier, and the profile consumer's profile identifier in the anonymized profile identifier datastore;

receiving a permissions profile modification request from the user device of the user to modify permissions profile information identified by the anonymized profile identifier;

modifying the permissions profile information associated with the user identified by the anonymized profile identifier, in response to receiving the permissions profile modification request to modify at least one permissions attribute of the user's permissions profile information; and synchronizing permitted profile information of the user stored in a permitted profile datastore based on the modification to the permissions attribute of the user's permissions profile information.

20. The computer-readable device of claim 19, wherein:
the provider's profile identifier is associated with a provider identifier that identifies a provider system, and
the profile consumer's profile identifier is associated with a profile consumer identifier that identifies the profile consumer system.

21. The computer-readable device of claim 19, wherein:
the provider's profile identifier is a unique identifier assigned by a provider system identified by a provider identifier assigned by a privacy services application, and
the profile consumer's profile identifier is a unique identifier assigned by the profile consumer system identified by a profile consumer identifier assigned by the privacy services application.

22. The computer-readable device of claim 19, the operations further comprising:

providing at least a portion of the permissions profile information identified by the anonymized profile identifier to the user device to visually present at least one permissions profile on the user device for modification; and notifying a permissions synchronization component regarding a modification to the at least one permissions attribute of the permissions profile information.

23. The computer-readable device of claim 22, further comprising:

determining the provider's profile identifier based on the anonymized profile identifier associated with the permissions profile information; and transmitting a permitted profile synchronization request to a permitted use gatekeeper application to synchronize the user profile information based on the permissions profile information, wherein the permitted profile synchronization request includes the provider's profile identifier for the user of a provider system and the permissions profile information of the user.

24. The computer-readable device of claim 23, wherein the permitted use gatekeeper application is configured to:

receive the permitted profile synchronization request from the privacy services application to synchronize the user profile information with the permissions profile information for the user of the provider system;

filter the user profile information identified by the provider's profile identifier based on the permissions profile information to generate the permitted profile information for the user identified by the provider's profile identifier;

store the permitted profile information in the permitted profile datastore managed by the provider system, wherein the permitted profile datastore is configured to store the permitted profile information for the user identified by the provider's profile identifier; and remove stored permitted profile information from the permitted profile datastore based on the modified permissions profile information.

* * * * *